(12) United States Patent
Assenmacher

(10) Patent No.: US 11,907,406 B2
(45) Date of Patent: Feb. 20, 2024

(54) COMPUTER-IMPLEMENTED METHOD AND SYSTEM OF TAMPER-EVIDENT RECORDING OF A PLURALITY OF SERVICE DATA ITEMS

(71) Applicant: Cryptowerk Corp., Redwood City, CA (US)

(72) Inventor: Holger Assenmacher, Eulenbis (DE)

(73) Assignee: CRYPTOWERK CORP., Redwood City, CA (US)

( * ) Notice: Subject to any disclaimer, the term of this patent is extended or adjusted under 35 U.S.C. 154(b) by 91 days.

(21) Appl. No.: 16/322,409

(22) PCT Filed: Jul. 31, 2017

(86) PCT No.: PCT/US2017/044729
§ 371 (c)(1),
(2) Date: Jan. 31, 2019

(87) PCT Pub. No.: WO2018/026727
PCT Pub. Date: Feb. 8, 2018

(65) Prior Publication Data
US 2019/0171849 A1      Jun. 6, 2019

Related U.S. Application Data

(60) Provisional application No. 62/369,199, filed on Aug. 1, 2016.

(51) Int. Cl.
*G06F 21/00* (2013.01)
*G06F 21/64* (2013.01)
(Continued)

(52) U.S. Cl.
CPC .......... *G06F 21/64* (2013.01); *G06F 16/9014* (2019.01); *G06F 21/602* (2013.01);
(Continued)

(58) Field of Classification Search
None
See application file for complete search history.

(56) References Cited

U.S. PATENT DOCUMENTS

| 4,309,569 A * | 1/1982 | Merkle | H04L 9/3236 340/5.8 |
| 8,510,566 B1 * | 8/2013 | Oprea | H04L 9/3297 713/181 |

(Continued)

FOREIGN PATENT DOCUMENTS

| WO | 2018/026727 A1 | 2/2018 | ............. G06Q 30/00 |

OTHER PUBLICATIONS

Buldas A., Kroonmaa A., Laanoja R. (2013) Keyless Signatures' Infrastructure: How to Build Global Distributed Hash-Trees. In: Riis Nielson H., Gollmann D. (eds) Secure IT Systems. NordSec 2013. Lecture Notes in Computer Science, vol. 8208. Springer, Berlin, Heidelberg. (Year: 2013).*

(Continued)

*Primary Examiner* — Jeffery L Williams
(74) *Attorney, Agent, or Firm* — Slayden Grubert Beard PLLC

(57) ABSTRACT

A computer-implemented method and a corresponding system of tamper-evident recording of a plurality of service data items are provided. Each service data item is associated with a data item verification fingerprint. A processing routine is conducted, in which an aggregated verification fingerprint is computed from at least a plurality of data item verification fingerprints using at least one one-way compression function, so that the aggregated verification fingerprint has a bit length, which is less than a bit length of a concatenation of the data item verification fingerprints. The aggregated verification fingerprint is then stored in at least one blockchain, so that a tamper-evident verification of each service data (Continued)

item is possible, while the storage of the aggregated verification fingerprint is decoupled from the service data items.

20 Claims, 12 Drawing Sheets

(51) Int. Cl.
| | |
|---|---|
| *G06Q 30/018* | (2023.01) |
| *G06F 16/901* | (2019.01) |
| *G06F 21/60* | (2013.01) |
| *G06Q 20/06* | (2012.01) |
| *H04L 9/06* | (2006.01) |
| *H04L 9/32* | (2006.01) |
| *H04L 9/40* | (2022.01) |
| *H04L 69/04* | (2022.01) |
| *H04L 9/00* | (2022.01) |

(52) U.S. Cl.
CPC ....... *G06Q 20/065* (2013.01); *G06Q 30/0185* (2013.01); *H04L 9/0637* (2013.01); *H04L 9/0643* (2013.01); *H04L 9/3236* (2013.01); *H04L 9/3247* (2013.01); *H04L 63/12* (2013.01); *H04L 69/04* (2013.01); *G06Q 2220/00* (2013.01); *H04L 9/50* (2022.05); *H04L 2209/56* (2013.01)

(56) References Cited

U.S. PATENT DOCUMENTS

| | | | | |
|---|---|---|---|---|
| 8,719,576 B2* | 5/2014 | Buldas | ................. | H04L 9/3265 |
| | | | | 713/168 |
| 9,473,306 B2* | 10/2016 | Buldas | ................. | H04L 9/3239 |
| 9,853,819 B2* | 12/2017 | Truu | ................. | H04L 9/3239 |
| 10,255,460 B2* | 4/2019 | Wilson | ............... | H04N 1/32272 |
| 11,080,433 B2* | 8/2021 | Ebert | ................. | H04L 9/0822 |
| 11,550,959 B2* | 1/2023 | Wilson | ............... | H04N 1/32133 |
| 2010/0212017 A1* | 8/2010 | Li | .................. | G06F 21/57 |
| | | | | 726/26 |
| 2013/0276058 A1* | 10/2013 | Buldas | ................. | G06F 21/30 |
| | | | | 726/2 |
| 2015/0295720 A1* | 10/2015 | Buldas | ................. | H04L 9/3239 |
| | | | | 713/176 |
| 2016/0253523 A1* | 9/2016 | Kroonmaa | ............. | G06F 21/64 |
| | | | | 726/26 |
| 2016/0261685 A1* | 9/2016 | Chen | ................. | H04L 41/28 |
| 2017/0033932 A1* | 2/2017 | Truu | .................. | H04L 9/3239 |
| 2017/0054736 A1* | 2/2017 | Krishnamurthy | ... | G06F 21/6209 |
| 2017/0295180 A1* | 10/2017 | Day | ................. | H04L 9/0836 |
| 2018/0005186 A1* | 1/2018 | Hunn | ................. | G06F 40/103 |
| 2018/0139057 A1* | 5/2018 | Truu | ................. | H04L 9/30 |
| 2018/0152442 A1* | 5/2018 | Buldas | ................ | G06F 21/64 |
| 2018/0198626 A1* | 7/2018 | Kroonmaa | ............ | H04L 9/0637 |
| 2018/0302417 A1* | 10/2018 | Wilson | ................. | G06F 16/24 |
| 2019/0171849 A1* | 6/2019 | Assenmacher | ......... | G06F 21/64 |
| 2019/0278920 A1* | 9/2019 | Black | ................. | G06F 21/64 |
| 2020/0366489 A1* | 11/2020 | Assenmacher | ....... | H04L 9/3239 |
| 2021/0065322 A1* | 3/2021 | Brown | ................. | G06Q 50/18 |

OTHER PUBLICATIONS

Digital Finance, "What is a blockchain fork?", May 15, 2017, https//www.digfingroup.com/what-is-blockchain-fork/, accessed May 22, 2021, p. 1-8. (Year: 2017).*

Laanoja, "Guardtime—Advanced trust services facilitated by the Industrial-Scale Blockchain technology", Jun. 25, 2015, ETSI Presentation, https://docbox.etsi.org/Workshop/2015/201506_SECURITYWEEK/eIDAS_THREAD/S07_TrustInfrastructureforSignaturesandeID/GUARDTIME_LAANOJA.pdf; acsd Dec. 16, 2021, p. 1-18. (Year: 2015).*

Crawford et al., "Blockchain technology as a platform for digitization—Implications for the insurance industry", 2016, EY, p. 1-16. (Year: 2016).*

Buldas, Ahto & Truu, Ahto & Laanoja, Risto & Gerhards, Rainer. (2014). Efficient Record-Level Keyless Signatures for Audit Logs. 8788. 149-164. 10.1007/978-3-319-11599-3_9. (Year: 2014).*

Merkle, Ralph C., "Secrecy, Authentication, and Public Key Systems," Ph.D. Dissertation, Dept. of Electrical Engineering, Stanford University, 193 Pages, Jun. 1, 1979.

Swan, Melanie, "Blockchain: Blueprint for a New Economy," Book Excerpt, O'Reilly, p. 37-43, Feb. 8, 2015.

International Search Report and Written Opinion, Application No. PCT/US2017/044729, 9 pages, Nov. 8, 2017.

Nakamoto, Satoshi, "Bitcoin: A Peer-to-Peer Electronic Cash System," URL: https://bitcoin.org/bitcoin.pdf, 9 pages, Oct. 31, 2018.

Miklau, Gerome et al., "Implementing a Tamper-Evident Database System," Advances in Computer Science 8211, ASIAN 2005 Lecture Notes in Computer Science, pp. 28-48, Jan. 1, 2005.

Crosby, Scott A. et al., "Efficient Data Structures for Tamper-Evident Logging," URL: http://static.usenix.org/event/sec09/tech/full_papers/crosby.pdf, 17 pages, Jan. 1, 2009.

European Office Action, Application No. 17761940.0, 9 pages, Apr. 5, 2023.

* cited by examiner

Dear Seal Witness user,
proof of the document that you uploaded at 2016-08-01 02-38-46 UTC
has been successfully registered in theworldwide public ledger, the blockchain.
You are now all set.
In particular, you now are in a position to be able to prove at any time to anyone
that you submitted your document and that it remained unaltered by using our verification service at
https://www.sealwitness.com:443/sealwitness.web/verify.jsp?
docRetrievalId=ri 173b79f8e 171 c 195b90650cb24b236666dc62ffff65e622d 1319b5fd04887b208
Thank you for using our service,
Your Seal Witness Team P.S.: Alternatively, in case that you are legally or technologically interested,
you could perform the verification all by yourself, even without using our service.
Here are the instructions:
Use SHA-256 to calculate a hash of your document, for instance by running openssl dgst -sha256 -hex your_document
The SHA-256 hash of the submitted document was
73b79f8e171c195b90650cb24b236666dc62ffff65e622d 1319b5fd04887b208.
Then take that hash 73b79f8el71cl95b90650cb24b236666dc62ffff65e622dl319b5fd04887b208 and append
3e21d24dfbf0a357fb4aa18e71670c8b941395c09b219028595f0b9c76c22cae to it.
Then calculate SHA-256 of the concatenation of the two, which is
58d4a5616ef6644054753901be30e54fa3ef3fb45b93c358a26178661ff7f6ca .
Then take that hash 58d4a5616ef6644054753901be30e54fa3ef3fb45b93c358a26178661ff7f6ca and append
c1c1f73cdb819a953da857344e8e67ad3fa0546b35343a1023388bc51fac920f to it.
Then calculate SHA-256 of the concatenation of the two, which is
527383779461ffd0924a415e9d24ae9e7a7fc76e55f1b79b5950f269c273f0ab.
Then take that hash 527383779461ffd0924a415e9d24ae9e7a7fc76e55flb79b5950f269c273f0ab and append
69481793495bdcc8b4a425c330c22cc4460b250f0c9142b2d53ed094cde3a9d3 to it.
Then calculate SHA-256 of the concatenation of the two, which is
493af06e912d2bbba27231 a7b8245cfdde229f97797cc 10a0672d03cddc871ae .
Then take that hash 493af06e912d2bbba27231a7b8245cfdde229f97797cc10a0672d03cddc871ae and append
b5e2093104ae051d1cbd36cede74e1c7237262fb79eaa8d5eebda7306a959820 to it.
Then calculate SHA-256 of the concatenation of the two, which is
923188377359563ca6fcf7c620d2e3dl06cfb4098c82e4cdf8c452b40b53336d.
This is the value which you will find publicly available in the blockchain named 'btc.test'
in transaction id=669bc832d35ff64ad481a49dacac95326dd1c48b38a953fff77ba35993f0e04e having been inserted there
at 2016-08-01 02-40-15 UTC
in section "vout"/n=0/"scriptPubKey"/"hex" as the sixth and following bytes.
In case you run a full node with option txindex=1 and are using the standard Bitcoin command line interface,
you might want to run
bitcoin-cli getrawtransaction 669bc832d35ff64ad481a49dacac95326dd1c48b38a953fff77ba35993f0e04e 1
Or you can take a look here:
https://www.bloc/txktrail.com/tBTC/tx/669bc832d35ff64ad481a49dacac95326dd1c48b38a953fff77ba35993f0e04e or
https://testnet.blockexplorer.com/669bc832d35ff64ad481a49dacac95326dd1c48b38a953fff77ba35993f0e04e or
https://tbtc.blockr.io/tx/info/669bc832d35fT64ad481a49dacac95326dd1c48b38a953fff77ba35993f0e04e or
https://live.blockcypher.com/btc-
testnet/tx/669bc832d35ff64ad481a49dacac95326dd1c48b38a953fff77ba35993f0e04e at the first "Output Scripts" entry at bytes four and following after OP_RETURN.

FIG. 8

COMPUTER-IMPLEMENTED METHOD AND SYSTEM OF TAMPER-EVIDENT RECORDING OF A PLURALITY OF SERVICE DATA ITEMS

CROSS-REFERENCE TO RELATED APPLICATIONS

This application claims the benefit of U.S. Provisional Patent Application 62/369,199, filed on Aug. 1, 2016. The contents of the aforesaid Provisional Patent Application are incorporated herein in its entirety for all purposes.

BACKGROUND

The presented invention relates to the field of blockchains, i.e., a computerized ledger system to create trusted records of (mostly) financial transactions.

In the year 2008, a system and algorithm has been presented for an electronic cash system (Satoshi Nakamoto, "Bitcoin: A Peer-to-Peer Electronic Cash System", available at https://bitcoin.org/bitcoin.pdf). Its underlying foundation, the so-called blockchain, enables distributed consensus without necessarily requiring trust. Consensus can be achieved on whether a certain data item has been presented at a given time. In Bitcoin, this is intended to publicly register electronic cash transfers and to prevent anyone from spending cash amounts more than once without requiring a central authority.

Due to the way the Bitcoin blockchain is constructed, its transaction throughput is limited, to a worldwide total of about seven transactions per second at the time of this writing (2016), and incurs cost to reimburse those operating the infrastructure. This led to other parties offering alternative technologies and blockchain implementations based on the same principles but trying to overcome the original limitations of the blockchain. A lot of financial investment and work has been put into the original Bitcoin blockchain and it still is by far the most widely used and most trusted blockchain and will remain so for the foreseeable future.

SUMMARY

The inventor of this application recognized that the Bitcoin blockchain as well as other currently used blockchains, allow not only to register financial transactions, but arbitrary data. This technically allows to use the blockchain to record data, other than financial transactions, such as contracts, documents, e.g., invention disclosures, and to allow showing that a certain owner or user had such contract or document at a certain time.

The present inventor however also recognized that due to the limited throughput of, e.g., the Bitcoin blockchain, registering such information at a scale would practically be infeasible, in particular due to time needed for the recordation of a large number of documents and the cost associated with doing so.

Accordingly, an object is given to increase the throughput of registering data in a blockchain to allow in particular the recordation of arbitrary data, such as contracts or documents.

The object is solved according to the computer-implemented method of tamper-evident recording of service data items and the system of tamper-evident recording of service data items according to the independent claims. Embodiments of the invention are described in the following description and the enclosed dependent claims.

In a first aspect of the invention, a computer-implemented method of tamper-evident recording of a plurality of service data items is provided, where each service data item is associated with a data item verification fingerprint. A processing routine is conducted, in which an aggregated verification fingerprint is computed from at least a plurality of the data item verification fingerprints using at least one one-way compression function, so that the aggregated verification fingerprint has a bit length, which is less than a bit length of a concatenation of the data item verification fingerprints. The aggregated verification fingerprint is stored in at least one blockchain.

In a second aspect of the invention, a system of tamper-evident recording of service data is provided. The system comprises at least a processing device, which processing device comprises at least a network interface, a service module, a compression module, and a blockchain connector module. The network interface is configured to connect to a communication network for sending and receiving data. The service module is connected with the network interface and configured to receive at least one of the group of: a plurality of service data items, and a plurality of data item verification fingerprints. The compression module is configured to compute an aggregated verification fingerprint from at least the plurality of data item verification fingerprints using at least one one-way compression function, so that the aggregated verification fingerprint has a bit length, which is less than a bit length of a concatenation of the data item verification fingerprints. The blockchain connector module is connected with the compression module and the network interface and configured to connect with at least one blockchain and to transmit the aggregated verification fingerprint to the at least one blockchain.

The methods and systems according to the invention "decouples" or separates services using service data items from the limitations of the underlying blockchain, in particular from its transaction throughput and implied cost, while retaining the blockchain's desirable properties.

These aspects and other aspects of the invention will be apparent from and elucidated with reference to the embodiments described hereinafter.

BRIEF DESCRIPTION OF THE DRAWINGS

In the drawings,

FIG. 8 shows an excerpt of an exemplary SmartStamp for retrospective verification.

DETAILED DESCRIPTION

Figure 1:
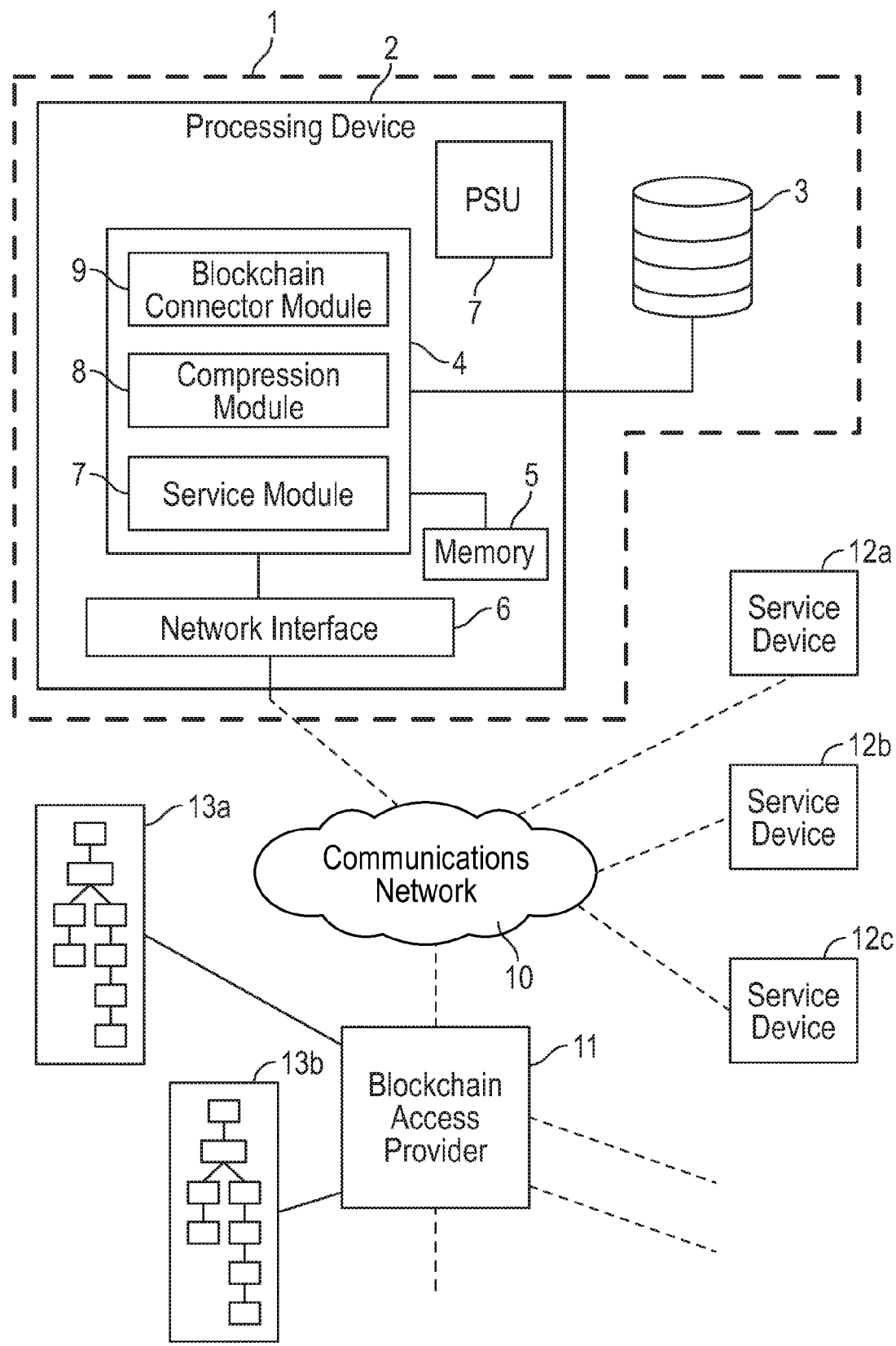
FIG. 1 shows a first embodiment of a system of tamper-evident recording of service data according to the invention in a schematic block diagram.

Technical features described in this application can be used to construct various embodiments of computer-implemented methods and systems for tamper-evident recording of a plurality of service data items according to embodiments described herein.

In the following explanation of the present invention according to the embodiments described, the terms "connected to/with", to "connect with", and "for connection to/with" are used to indicate a data connection between at least two devices, components, elements, modules, or units. Such connection may be direct or indirect, i.e., in the latter case over intermediate devices, components, elements, modules, or units. The respective connection may be conductor/wire-based or wireless. Furthermore, the respective connection may be permanent or temporary.

For example, a connection may be provided over a WAN (wide area network), and/or LAN (local area network), comprising, e.g., the Internet, Ethernet networks, cellular networks, Bluetooth networks, and/or Wi-Fi networks using a corresponding suitable communications protocol.

According to the first aspect, a computer-implemented method of tamper-evident recording of a plurality of service data items is provided, where each service data item being associated with a data item verification fingerprint. A processing routine is conducted, in which an aggregated verification fingerprint is computed from at least a plurality of the data item verification fingerprints using at least one one-way compression function, so that the aggregated verification fingerprint has a bit length, which is less than a bit length of a concatenation of the data item verification fingerprints. The aggregated verification fingerprint is stored in at least one blockchain.

In the context of the present invention, I refer to a blockchain or a "blockchain database" as a data structure having a plurality of (data) blocks, where each block comprises at least information (payload), and a link to a previous block. The link provides that, once a first block and a second subsequent block is recorded in the database, the information in the first block cannot be altered retroactively without the alteration of the second block and all eventual subsequent blocks. Certainly, according to typical blockchain technology, the first "genesis" block does not require a link.

The link may in an embodiment be a cryptographic link, typically also depending on the contents of the referred block itself, such as a cryptographic hash of the previous block, for example using a one-way function (e.g. a cryptographic hash function, such as MD5, SHA-3, SHA-2, SHA-1, BLAKE, BLAKE2). The blockchain certainly and in corresponding embodiments may comprise further elements. For example, each block of the blockchain may comprise a time stamp, etc.

The payload of a blockchain typically is divided into a plurality of data entries, also referred to as "transactions" or "blockchain transactions" in the art. This language is also used in the present discussion. Transactions may have a defined length, a defined maximum length, or an arbitrary length depending on the setup of the respective blockchain.

In the context of the present invention, the term "service data item" is understood to comprise electronic data of any type, length, and content, e.g., a bit string. Typically, the specific data contents and type may depend on the respective application, i.e., the respective "service" herein. For example, for purposes of document recording, the service data item may comprise electronic document data, e.g., a file, such as in the Portable Document Format (.pdf), Word® format (.doc or .docx), or XML format (.xml). In an alternative or additional embodiment, the service data item, e.g., in the case of a digitized "real" document, may comprise one or more images of the corresponding document. The service data item may in another additional or alternative embodiment comprise one or more generic tokens, asset tokens, or digital currency tokens, such as related to a virtual currency or a cryptocurrency.

Not only data items may be recorded. The presented method of the present aspect may also be used to implement the execution of program code based on a virtual machine residing in the blockchain itself, commonly referred to as "smart contracts". To that end, the service data item may in another additional or alternative embodiment comprise one or more of the pre-execution and post-execution states of a virtual machine. The service data item may in another additional or alternative embodiment comprise the smart contract data itself. The validity of this procedure is based on the observation of the present inventor that all the effects of executing a smart contract can be captured by the state of an execution automaton before and after the execution of a contract method and recording both or their respective fingerprints in the blockchain.

However, as will become apparent from a study of the present disclosure of the invention, the discussed methods and systems are not limited to particular data. Instead, the methods and systems disclosed allow recording of data independent of its data type, length, and content. Thus, it is possible to record arbitrary data and by this, the invention can be employed for a wide range of applications/services.

In the context of the present invention, the term "tamper-evident recording" of a service data item (also referred to as "service data" herein) relates to a process that allows verification of the data content of a given service data item in relation to time. In other words, the discussed methods and systems of the invention allow, after the processing of a given service data item, to retrospectively verify if the data content of the given service data item was present at a certain time and remained unaltered. This functionality corresponds to a notarization of a paper document. Thus, the invention provides a functionality similar to an "electronic notary".

It is noted, that "time" herein comprises all representations of date and/or time. Typically, and in one embodiment, the invention enables to verify the presence of a service data item at a specific date and at least a rough time, such as "2 pm GMT" or "14.30 GMT". For other applications, e.g., an "electronic notary", it may however in an embodiment be sufficient to just record the date the service data item was presented for recording by the system or method, respectively.

As discussed in the preceding, each service data item is associated with a data item verification fingerprint. The term data item verification fingerprint in the present context is understood as a fingerprint of the service data item, wherein a "fingerprint" is understood with its typical meaning in computer science, namely a bit string that uniquely (or quasi-uniquely) identifies the original data for all practical purposes. A corresponding fingerprint in one exemplary embodiment may be generated using a fingerprint function. For example, the fingerprint function/algorithm should in one embodiment be able to capture the identity of a service data item with virtual certainty. In other words, the probability of a collision, i.e., two service data items yielding the same fingerprint, should be negligible. In another alternative or additional embodiment, the data item verification fingerprint has a shorter length, compared to its associated service data item. In a further alternative or additional embodiment, the fingerprint function comprises one or more cryptographic one-way and in particular cryptographic hash functions, such as for example MD5, SHA-3, SHA-2, SHA-1, BLAKE, BLAKE2.

According to the present aspect, a processing routine is conducted, in which an aggregated verification fingerprint is computed from at least a plurality of the data item verification fingerprints using at least one one-way compression function, so that the aggregated verification fingerprint has a bit length, which is less than a bit length of a concatenation of the data item verification fingerprints. The aggregated verification fingerprint is stored in at least one blockchain. It is noted that reference to storing of the aggregated verification fingerprint in one embodiment may relate to submission of the verification fingerprint to the blockchain. Alternatively, and in another embodiment, it may relate to transmission of the verification fingerprint to an intermediate device or service, i.e., a "blockchain proxy", a gateway, bridge, e.g. a blockchain service provider, or in special cases a blockchain mining operator.

As will be apparent from the above, the processing routine thus allows to compress the data item verification fingerprints into the aggregated verification fingerprint and then to store the latter in the blockchain. This is particularly beneficial in view of the blockchain space savings. Instead of having to store all of the plurality of data item verification fingerprints, it is only necessary to store the aggregated verification fingerprint in the blockchain, the latter of which has a shorter bit length than all of the data item verification fingerprints collectively, resulting in a time and cost efficient recording data in the blockchain.

In the context of the present invention, a "one-way compression function" is understood as a function that transforms an input of a certain overall length into a smaller length output. In an embodiment, the compression function transforms a large variable-length input into a shorter, fixed-length output. The function is one-way, meaning that it is difficult given a particular output to compute inputs which compress to that output.

The one-way compression function may be of any suitable type. In one additional or alternative embodiment, the one-way compression function is a cryptographic hash function. Using a cryptographic hash function is particularly beneficial in view that such function allows to map data of arbitrary size to data of a fixed size. Accordingly, this embodiment provides to increase the service data (item) throughput. In view that the processing routine is conducted separate or "outside" of the blockchain, the increase in throughput is substantially independent from the throughput of the blockchain. Accordingly, the current embodiment is particularly beneficial for large amounts of service data.

Once the aggregated verification fingerprint is stored in the blockchain, i.e., in a block of the cryptographically chained blocks, the aggregated verification fingerprint is considered to be virtually unchangeable, at least without changing all subsequent blocks in the chain. This is generally considered to be unfeasible for most typical blockchains. Accordingly, the blockchain allows to determine, when the aggregated verification fingerprint was presented. This could either be done for example by a reviewing a time stamp of the respective block, if present in the respective blockchain, or by cryptographically embedding a trusted time stamp in a transaction or in the aggregated verification fingerprint and then checking this trusted time stamp.

In view of the aggregated verification fingerprint being related to each data item verification fingerprint processed, and each processed data item verification fingerprint in turn being related to the associated service data item, the method according to the present embodiment thus allows to retrospectively verify if the data content of the given service data item was present at a certain time, thus providing the aforementioned, electronic notary functionality. It is noted that the method according to the present aspect does not require use of cryptographic keys, which could get lost over time.

Also, the use of the method of the present aspect allows to "bundle" a multitude of service data items. Thus, if public blockchains are used, the associated transaction fees (if any) of writing a blockchain transaction, can be shared among the multitude of service data items and their respective owners.

To verify retrospectively, one could compute, starting with the respective service data item, the associated data item verification fingerprint. Then, using the associated data item verification fingerprint and the data item verification fingerprints of the further processed data item verification fingerprints, compute the aggregated verification fingerprint. In case this retrospectively calculated aggregated verification fingerprint matches the aggregated verification fingerprint, stored in block "x" of the blockchain, the date/time of block x can be regarded, with a high degree of certainty, the date/time the respective service data item was presented "as is", i.e., unaltered.

In addition, and in view that the aggregated verification fingerprint—or aggregated verification fingerprints if the processing routine is conducted multiple times—are separate from the service data items, while still enabling the above-mentioned verification, the present method provides a high level of privacy in view that the service data items themselves do not need to be stored in the blockchain and can be kept private by the respective service, e.g., an owner of the service data item. Thus, the present method provides "decoupled" recording or "notarization". The method in particular allows to use public blockchains in corresponding embodiments, even for private or sensitive data, as will be discussed in more detail in the following.

In additional embodiments, the plurality of service data items and/or the plurality of data item verification fingerprints are not stored in said at least one blockchain, i.e., the at least one blockchain, in which the aggregated verification fingerprint is stored. Certainly, it is conceivable in one embodiment that the plurality of service data items and/or the plurality of data item verification fingerprints are stored in another blockchain, for example a private blockchain, which however differs from the at least one blockchain in which the aggregated verification fingerprint is stored, so that a separation is given.

The present aspect of the invention and in particular the processing of the processing routine allows to save space when recording a plurality of data item verification fingerprints in a blockchain, as discussed in the preceding. In one embodiment, the data item verification fingerprint has a bit length, which is less than a bit length of the associated service data item. For example, the data item verification fingerprint may be computed using a one-way compression function, such as a cryptographic hash function. Doing so may result in an even better compression ratio from the service data item to the aggregated verification fingerprint, facilitating further improved efficiency.

In another alternative or additional embodiment, the aggregated verification fingerprint is stored in a plurality of blockchains, i.e., different blockchains. The present embodiment increases the reliability of the method of the present aspect further in particular for long-term reliability, since the likelihood that multiple different blockchains stop existing understandably is lower than that of a single blockchain. While this is in particular true for public blockchains, such as the Bitcoin blockchain, the Ethereum blockchain, and the Hyperledger blockchain, even with private blockchains or a combination of public and private blockchains, the likelihood of error decreases with the number of blockchains used for storage of the aggregated verification fingerprint.

The present embodiment also allows to initiate a "master digital currency" by storing digital currency tokens in a plurality of digital currency blockchains, which would have a decreased financial risk for investment in view of the provided "pooling" of currencies. In another additional or alternative embodiment, this can provide a means of transferring tokens from one to another (different) blockchain.

In another alternative or additional embodiment, the aggregated verification fingerprint is stored in a plurality of forked blocks of one or more blockchains. In the current context, a fork or blockchain fork is understood with its ordinary meaning, namely blocks at the same height of the blockchain, where the latter permanently splits into two separate chains. In particular, this may refer to forks caused by changes in the underlying ruleset or software. It does not however refer to a temporary disagreement of which blocks should be added to the head of the chain in the course of achieving consensus.

A plurality of forked blocks thus refers to at least two blocks which are located in different forks of the blockchain. In case the aggregated verification fingerprint is stored in a plurality of forked blocks, the reliability of the method of tamper-evident recording according to the present embodiment is further improved by essentially "unforking" the blockchain by being able to anchor the root of data item verification fingerprints (the fingerprints of service data items) in all or some forks concurrently.

According to a further alternative or additional embodiment, the processing routine is conducted repeatedly to subsequently store a plurality of aggregated verification fingerprints in the at least one blockchain.

Note that the additional space requirement imposed on the blockchains which are used for recording is small in this aspect. Independently of the actual number of service data items in a bundle, only one aggregated verification fingerprint, i.e., the root of a hash tree, is stored per blockchain. This typically is orders of magnitude smaller than actually recording all service data items or their hashes.

Although the method of tamper-evident recording according to the present aspect allows to record a plurality of data item verification fingerprints in a single blockchain transaction, situations may arise when multiple aggregated verification fingerprints need to be stored in separate blockchain entries, i.e., transactions. For example, such situation could arise when an aggregated verification fingerprint has just been stored to the at least one blockchain and further service data items subsequently need to be recorded. The processing routine in this embodiment would be conducted two times, either subsequently or in parallel, and the first and second aggregated verification fingerprints are then stored subsequently in the at least one blockchain.

In another example, the method of tamper-evident recording according to the present aspect could be used in a "recording (cloud) service", where third parties can submit service data items or their associated data item verification fingerprints to, and which are then processed with the discussed processing routine. In this example, it may be feasible to setup a "service data FIFO queue", which output is provided to the processing routine. The queue in this example may provide a pre-defined number of service data items or data item verification fingerprints to the processing routine at a time, from which a corresponding aggregated verification fingerprint is computed, as discussed in the preceding. In case of a large number or continuous input flow of service data items or data item verification fingerprints, the processing routine is executed repeatedly, to subsequently store a plurality of different aggregated verification fingerprints in the at least one blockchain.

In all of the above examples, the repeated storage of aggregated verification fingerprints may, e.g., be triggered by a certain number of service data items or data item verification fingerprints presented. Alternatively or additionally, storage of the aggregated verification fingerprints may be conducted according to a predefined schedule or in predefined intervals, for example according to the requirements of the application.

As discussed in the preceding, the one-way compression function according to the present invention transforms an input of a certain length into a smaller, e.g., fixed-length output. The data item verification fingerprints are used as input to the one-way compression function in aggregated form, for example, by concatenating all fingerprints into a bit stream and then using the concatenated data as one input to the one-way compression function.

In another alternative or additional embodiment, the step of computing the aggregated verification fingerprint comprises computing a hash tree from the plurality of data item verification fingerprints.

A hash tree allows efficient compression (i.e., herein, the "shortening" of a bit string) and also later verification, in particular for large amounts of data. The hash tree of the present embodiment may be of any suitable type, for example a "Merkle Tree", i.e., a binary tree. In further embodiments, a tertiary tree or a higher order (greater than three) tree architecture is used. Hash lists and hash chains are also understood as comprised by the term of a "hash tree".

The details of the functionality and concept of a Merkle Tree are disclosed, e.g., in: Ralph Merkle "Secrecy, authentication and public key systems/A certified digital signature", Ph.D. dissertation, Dept. of Electrical Engineering, Stanford University, 1979, and in U.S. Pat. No. 4,309,569 to Ralph C. Merkle, patented on Jan. 5, 1982. The contents of both of the aforementioned documents are incorporated herein for all purposes.

In one embodiment, a "Merkle Tree" function is used for computing the aggregated verification fingerprint(s) from the plurality of data item verification fingerprints. In view that the Merkle Tree is a binary tree, the number of the plurality of data item verification fingerprints needs to be a power of two. If the number of fingerprints is not a power of two, it is filled up with one or more dummy fingerprints to the next bigger power of two.

The number of hashes required to recalculate all hashes along the path of the Merkle Tree from the original service data item or its verification fingerprint to a root of the Merkle Tree is of the order $O(\log N)$, where N is the total number of fingerprints to be registered within one aggregated verification fingerprint, e.g. a single blockchain transaction.

Using a Merkle Tree function allows for example to store electronically or even to print out on paper, the (few) hashes required to recalculate and hereby to verify a fingerprint later on. At each step starting from a leaf, the hash of the previous step is appended or prepended to the hash of the current step and then hashed again until the root is reached. Accordingly, the present embodiment allows a very efficient verification.

In the present embodiment, any suitable cryptographic hash function may be used. For example, one or more cryptographic hash functions of the group of the hash functions of MD5, SHA-3, SHA-2, SHA-1, BLAKE, and BLAKE2 is used. It is noted that the present explanation is not limited to any particular hash function. Accordingly, the invention can be operated with any cryptographic hash function known now or in the future.

In a further additional or alternative embodiment, the step of computing the aggregated verification fingerprint comprises computing a plurality of hash trees from the verification data item fingerprints. Herein, at least a first hash tree is computed using a first cryptographic hash function and a second hash tree is computed using a second cryptographic hash function, wherein the first and second cryptographic hash functions differ from each other.

The idea of this embodiment is to use multiple different hash functions for the aggregated verification fingerprint to improve security in case one particular hash function should get insecure over a time. For example, the SHA-1 hash function, published in 1995, was abandoned around 2010 since collision pairs were found.

According to the present embodiment, the processing routine for the same plurality of data item verification fingerprints is conducted at least two times, namely a first time using the first cryptographic hash function, and a second time using the second cryptographic hash function. The two resulting aggregated verification fingerprints are then stored in the at least one blockchain in the same transaction or different transactions, e.g., in the same or different blocks. In one example, the two resulting aggregated verification fingerprints are stored in the same transaction in the at least one blockchain together with identifiers that relate to the respective cryptographic hash function used to allow an efficient retrospective verification.

In another alternative or additional embodiment, the computing of the hash tree comprises computing of a root hash and one or more branch node hashes. In this context, the term "branch node hash" is understood as a hash of two previous hashes in the tree. These could be two data item verification fingerprints or two previous branch node hashes in the tree. A "root hash" is understood according to its definition in U.S. Pat. No. 4,309,569, i.e., hash $H(1,n, Y)$, also referred to as R. The root hash by its definition also is a branch node hash, namely the last one calculated. The service data items are also referred to as $Y_n$ and the data item verification fingerprints are also referred to as $H(n,n,Y)$ in the following and in line with the nomenclature of U.S. Pat. No. 4,309,569.

In one embodiment, the aggregated verification fingerprint comprises at least the root hash R of the hash tree.

In another alternative or additional embodiment, at least for a first data item verification fingerprint of the plurality of data item verification fingerprints, a first authentication path comprising one or more hashes is determined in the hash tree.

The first authentication path is associated with a branch path from the first data item verification fingerprint $H(1,1,Y)$ to the root hash R. For an exemplary hash tree of eight leaves (n=8), the branch path from $H(1,1,Y)$ to R includes $H(1,2,Y)$, $H(1,4,Y)$, and $H(1,8,Y)=R$.

The authentication path comprises all hashes of the hash tree, that are necessary to verify a particular data item verification fingerprint $H(n,n,Y)$. This in turn allows to verify the authenticity of the respective associated service data item. It is noted that the definition of term "authentication path" corresponds to the very same term in U.S. Pat. No. 4,309,569.

As will be apparent to those skilled in the art, for the exemplary first data item verification fingerprint $H(1,1,Y)$, the second data item verification fingerprint $H(2,2,Y)$ and the branch node hashes $H(3,4,Y)$ and $H(5,8,Y)$ are required to compute root hash R and thus to verify the associated first service data item $Y_1$.

In the present embodiment, and assuming that N data item verification fingerprints are arranged as leaves and recursively combining the hashes of the roots of two subtrees of the tree to be the value of a branch node hash ("inner non-leaf node"), approximately 2N hashes are generated, including the N hashes of the service data items themselves, i.e., the data item verification fingerprints. A verification routine/procedure for one given service data item only requires the hashes of the authentication path from the root, which is stored in the at least one blockchain as the aggregated verification fingerprint, to the respective leaf, i.e., only $\log_2(N)$ hashes are required for retrospective verification.

Certainly, and in one embodiment, a plurality of authentication paths are determined from the hash tree. For example, for each data item verification fingerprint, and thus for each service data item, the respective authentication path is determined from said hash tree.

In one additional or alternative embodiment, a verification database is provided. The verification database allows storing verification data, such as for example hashes, associated with the respective authentication paths, so that it is easily possible to verify a particular service data item retrospectively. It is noted that the verification database in an embodiment can be setup so that full privacy is provided, namely by not storing the respective service data items, but only the hashes, required for verification purposes. This makes intrusion and copying of the verification database by malicious third parties pointless.

The verification database may be of any suitable type. The database may be a standard relational database in one embodiment, or a further (possibly private) blockchain in another embodiment. The verification database may be a centralized database, or a decentralized database, e.g., comprising a plurality of sub-databases.

In one example, the one or more hashes of said first authentication path are stored in the verification database, i.e., $H(2,2,Y)$, $H(3,4,Y)$, and $H(5,8,Y)$. In another example, the one or more hashes of a plurality of authentication paths are stored in the verification database. In yet another example, the one or more hashes of a plurality of authentication paths for all of the plurality of data item verification fingerprints are stored in the verification database.

In another alternative or additional embodiment, the first data item verification fingerprint is stored in the verification database and is correlated with the one or more hashes of said first authentication path.

The present embodiment allows a particularly effortless verification of the first data item verification fingerprint and thus the associated first service data item. The term "correlated" in this embodiment is understood to comprise both, the actual data as well as links to the actual data. For example, in an embodiment, where the plurality of data item verification fingerprints are stored in the verification database and are correlated to the one or more hashes of their respective authentication paths, it may be beneficial to use a link to a single copy of the respective hash to save space, in particular in view that the different authentication paths will share the same hashes. For example, and in the nomenclature of U.S. Pat. No. 4,309,569, the branch node hash H(5,8,Y) is needed in the authentication paths of data item verification fingerprints H(1,1,Y), H(2,2,Y), H(3,3,Y), and H(4,4,Y).

In another alternative or additional embodiment, the aggregated verification fingerprint is stored in at least a first block of the at least one blockchain, wherein an identifier of the first block is stored in the verification database.

In the present embodiment, the identifier serves as a reference to the respective block, i.e., herein the "first block", to allow to quickly identify the block of the at least one blockchain, into which the respective aggregated verification fingerprint was written. This facilitates a particularly efficient retroactive verification.

The identifier may be of any suitable type, such as for example a block identifier, a time stamp, or a transaction identifier.

The identifier may in one embodiment be stored in the verification database and correlated to the respective aggregated verification fingerprint. In alternative or additional embodiments, the identifier may be correlated to one or more data item fingerprints, one or more service data items, or one or more authentication paths in the verification database. Certainly, in case the processing routine is conducted repeatedly, suitable identifiers may be stored for each processing routine run or, respectively, for each resulting aggregated verification fingerprint, in the verification database.

Alternatively or in addition to the use of the discussed verification database and in corresponding embodiments, at least some of the information, computed or retrieved during the processing routine may be transferred to the user/owner of a service data item, either before or after storing of the aggregated verification fingerprint in the at least one blockchain.

In one example, at least one or more hashes of said first authentication path are transferred to a service device. The service device then may be able to verify the service data item remotely and independently from the processing routine, accordingly even after a provider of the method according to the present aspect should cease operation.

In another alternative or additional embodiment, the first data item verification fingerprint is transmitted to the service user. This may be particularly useful in case the first data item verification fingerprint is computed as part of the processing routine, which will be explained in the following.

In another alternative or additional embodiment, the aggregated verification fingerprint is transmitted to the service device.

In yet another alternative or additional embodiment, the aggregated verification fingerprint is stored in at least a first block of the at least one blockchain, wherein an identifier of the first block is transmitted to the service device. With respect to the identifier, reference is made to the discussion of storing the identifier in the verification database in the preceding.

In a further alternative or additional embodiment, the hashes of the authentication path, necessary for verifying the service data item, and at least one identifier to the aggregated verification fingerprint (e.g., transaction identifier, blockchain identifier) are transmitted to the service device. Since in this embodiment, all information for retrospective verification are transmitted to the service device, the transmitted information corresponds to a "seal" or "SmartStamp".

In the present context, the term service device relates to a device that is associated with the respective service data item of the first data item verification fingerprint. In most instances, the device will correspond to the device, that provided the first data item verification fingerprint to the processing routine. The service device thus may be a a (cloud) service, computing device, smartphone, tablet, IoT device, smart wearable, server, etc. that a service data item owner uses. Certainly, the above may be provided for all service devices of the associated service data items that are processed in a corresponding embodiment.

In another additional or alternative embodiment, the plurality of service data items are received and for each received service data item, an associated data item verification fingerprint is computed using a fingerprint function.

According to the present embodiment, the data item verification fingerprints, associated with the service data items received are computed as a part of the processing of the method of tamper-evident recording of the current aspect. Accordingly, the respective service data owner does not need to conduct any computing, thus allowing also devices with very limited computational resources (mobile phones, tablets, IoT devices, etc.) to employ the tamper evident recording as discussed herein.

The fingerprint function may be of any suitable type to provide a data item verification fingerprint. Reference is made to the preceding discussion relating thereto.

For example, the fingerprint function/algorithm should in one embodiment be able to capture the identity of a service data item with virtual certainty. In other words, the probability of a collision, i.e., two service data items yielding the same fingerprint, should be negligible. In another alternative or additional embodiment, the data item verification fingerprint has a shorter length, compared to its associated service data item. In a further alternative or additional embodiment, the fingerprint function comprises one or more cryptographic one-way and in particular cryptographic hash functions, such as for example MD5, SHA-3, SHA-2, SHA-1, BLAKE, BLAKE2.

In another additional or alternative embodiment, the method further comprises verifying the stored aggregated verification fingerprint in the at least one blockchain. This step may be conducted directly after storing the aggregated verification fingerprint in the at least one blockchain, or after a given time interval. In any case, the additional verification serves to assure that no transmission error occurred and that the aggregated verification fingerprint was duly registered in the at least one blockchain.

In particular, when using a consensus algorithm based on proof-of-work, storing of the aggregated verification fingerprint may take some time. Accordingly, it may be beneficial to verify the successful storing, e.g., an hour after the aggregated verification fingerprint has been submitted for storage.

In another additional or alternative embodiment, the at least one blockchain is a public blockchain. Using a public blockchain generally provides a high level of trust in view of their ledger functionality and the fact that altering a block in a public blockchain becomes virtually impossible once a certain number of subsequent blocks are written to the respective blockchain.

In one additional or alternative embodiment, the at least one blockchain is a highly distributed blockchain, i.e., stored on a large number of computers/servers for a high level of reliability, trust, and less danger of censorship or unilateral control. In particular, small numbers of nodes, say between 4 and 32 instead of at least some thousand, cannot be effectively protected against coordinated attacks or outright domination without requiring some level of trust in the first place, a requirement that should typically have been removed by employment of a blockchain.

In another additional or alternative embodiment, the at least one blockchain corresponds to a digital currency blockchain. In view that such blockchains readily exist, the application of the method of tamper-evident recording according to the present aspect becomes particularly cost efficient. For example, the aggregated verification fingerprint is stored in a plurality of blockchains from the group of blockchains of Ethereum, Hyperledger, Sawtooth Lake, Auroracoin, Blackcoin, Burstcoin, Peercoin, Namecoin, Dogecoin, Litecoin, PotCoin, Zcash, Zcoin, ZeroVert, Zerocoin, Bytecoin, Monero, DigitalNote, Boolberry, Ubiq, Nem, and Nxt.

According to a second aspect, a computer-implemented method of tamper-evident recording of service data is provided, wherein at least a plurality of service data items are received; for each service data item, an associated data item verification fingerprint is computed using a fingerprint function; an aggregated verification fingerprint is computed from at least the associated verification data item fingerprints using a one-way compression function, so that the aggregated verification fingerprint has a bit length, which is less than a bit length of a concatenation of the data item verification fingerprints; and wherein the aggregated verification fingerprint is stored in at least one blockchain for decoupling of the storage of the aggregated verification fingerprint from the service data.

The method according to the present aspect and in further embodiments may be configured according to one or more of the embodiments, discussed in the preceding with reference to the preceding aspect.

According to another aspect, a system of tamper-evident recording of service data is provided. The system comprises at least a processing device, the latter of which comprises at least a network interface, a service module, a compression module, and a blockchain connector module.

The network interface in the present context may be of any suitable type to connect to a communication network for sending and receiving data, such as for example a WAN (wide area network), and/or LAN (local area network), comprising, e.g., the Internet, Ethernet networks, cellular networks, Bluetooth networks, and/or Wi-Fi networks using a corresponding suitable communications protocol.

The aforementioned service module is connected with the network interface and configured to receive at least one of the group of: a plurality of service data items and a plurality of data item verification fingerprints. In a basic embodiment, the service module is configured to receive the plurality of data item verification fingerprints.

The compression module is configured to compute an aggregated verification fingerprint from at least the plurality of data item verification fingerprints using at least one one-way compression function, so that the aggregated verification fingerprint has a bit length, which is less than a bit length of a concatenation of the data item verification fingerprints.

The blockchain connector module is connected with the compression module and the network interface and configured to connect with at least one blockchain and to transmit the aggregated verification fingerprint to the at least one blockchain to allow storing the aggregated verification fingerprint in the at least one blockchain decoupled from the service data.

Certainly, the processing device according to the present aspect may comprise one or more further components, such as for example a housing, a power supply, and a user interface.

It is noted, that the term "module" as used herein may refer to a collection of routines and data structures that perform the configured task or that implements a particular data structure. Modules may in an embodiment be composed of two parts, namely 1) an interface that lists constants, data types, variables, and routines that can be accessed by other modules, devices, interfaces, or routines, and 2) an implementation that is typically private, accessible only to that module, and includes source code that implements the routines in the module.

The term "module" may also refer in corresponding embodiments to an application or program, such as a computer program, to assist in the performance of a specific task when executed on a processor or controller. In other examples, at least part of a module may be implemented by hard-wired logic or other circuitry.

In one additional or alternative embodiment, the processing device comprises a microprocessor and memory. In this embodiment, the memory comprises computer-readable instructions that cause the microprocessor to provide the functionality of the aforementioned service module, compression module, and/or blockchain connector module.

Instead of a microprocessor, and in corresponding embodiments, a microcontroller, gate array, and/or an application specific integrated circuit (ASIC) may be used.

In another additional or alternative embodiment, the service module is configured to receive a plurality of service data items and for each service data item, to compute an associated data item verification fingerprint using a fingerprint function. In view that the data item verification fingerprints are generated by the service module, it is certainly just necessary to receive the respective plurality of service data items. With respect to the details of the fingerprint function and its definition, reference is made to the respective preceding discussion of the method of the first aspect.

The system according to the present aspect and in further embodiments may be configured according to one or more of the embodiments, discussed in the preceding with reference to the preceding aspects.

A computer program or module may be provided to enable the processing device to carry out the methods discussed above. The computer program may be contained on a computer readable medium, such as a solid state, magnetic, or optical storage device.

In another aspect, a system of tamper-evident recording of service data is provided, which comprises at least a processing device. Herein, the processing device comprises a network interface, configured to connect to a communication network for sending and receiving data; a service module, connected with the network interface and configured to receive a plurality of service data items and for each service data item, to compute an associated data item verification fingerprint using a fingerprint function; a compression module, configured to compute an aggregated verification fingerprint from at least a plurality of data item verification fingerprints using at least one one-way compression function, so that the aggregated verification fingerprint has a bit length, which is less than a bit length of a concatenation of the data item verification fingerprints; and a blockchain connector module, connected with the compression module and the network interface and configured to connect with at least one blockchain and to transmit the aggregated verification fingerprint to the at least one blockchain to allow storing the aggregated verification fingerprint in the at least one blockchain decoupled from the service data items.

In one additional embodiment, the system further comprises a verification database, which verification database is connected at least with the processing device, e.g., through the network interface of the processing device.

In another additional embodiment, the verification database is configured for storing one or more of the group of service data items, data item verification fingerprints, aggregated verification fingerprints, authentication paths, blockchain identifiers, block identifiers of the at least one blockchain, and transaction identifiers of the at least one blockchain.

The system according to the present aspect and in further embodiments may be configured according to one or more of the embodiments, discussed in the preceding with reference to the preceding aspects.

A computer program or module may be provided to enable the processing device to carry out the methods discussed above. The computer program may be contained on a computer readable medium, such as a solid state, magnetic, or optical storage device.

Reference will now be made to the drawings in which the various elements of embodiments will be given numerical designations and in which further embodiments will be discussed.

Specific reference to components, process steps, and other elements are not intended to be limiting. Further, it is understood that like parts bear the same or at least similar reference numerals, when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

FIG. 1 shows a first embodiment of a system 1 of tamper-evident recording of service data in a schematic block diagram. The system 1 comprises a processing device 2 and a verification database 3. Processing device 2 in the present embodiment is a computer/server and comprises a microprocessor 4 (e.g., Intel i7) with memory 5, and further a network interface 6 and a power supply unit 7. For reasons of clarity, the connections from and to power supply unit 7 are not shown in FIG. 1.

As can be seen from FIG. 1, processor 4 in this embodiment comprises a service module 7, a compression module 8, and a blockchain connector module 9, the functionality of which will be explained in detail in the following. These modules are provided as programming, stored in memory 5. Execution of the corresponding programming by processor 4 causes the processor 4 to provide the functionality of the aforementioned modules 7-9.

Network interface 6 connects the processing device 2 and more precisely the processor 4 with a communications network 10, e.g., the Internet. Network interface 6 is configured to receive and transmit data, for example from and to a blockchain access provider 11 as well as from and to multiple service devices 12a-12c.

The blockchain access provider 11 allows the processing device 2, and more precisely the blockchain connector module 9, to access multiple blockchains 13a, 13b, and in this embodiment the Bitcoin blockchain as well as the Ethereum blockchain. It is noted, that generally the two blockchains 13a, 13b may be formed by a multitude of nodes. For increased clarity, a summarized representation for this typical and so-called "distributed ledger" setup is shown in FIG. 1 to not obscure the present explanation. While the number of nodes of the respective blockchains 13a and 13b are not of particular importance, a large number of nodes, as will be apparent to one skilled in the art, increases the security of the system 1 in view of the increased number of copies of the blockchain.

Service devices 12a-12c in this embodiment provide data item verification fingerprints to the system 1 over communications network 10. The data item verification fingerprints are cryptographic one-way hashes of associated service data items that are to be recorded by system 1. A service data item comprises (arbitrary) data. For the present discussion of the embodiment of FIG. 1, the service data items comprise each a file of an electronic document, such as in Portable Document Format (.pdf) or in JPEG Format (.jpg).

It is emphasized that the service data items themselves are not transmitted to the system 1 in this embodiment, providing a high level of privacy, which is also referred to in the following as "ultimate privacy concept". Ultimate privacy is provided in view that the system 1 allows to verify the existence of a particular piece of information, i.e., the service data item, at a given time, while the respective piece of information does not need to be presented to the system 11. This is highly beneficial not only for classified information, but also for sensitive business and personal data to avoid eavesdropping during transmission and processing.

In the context of the present explanation, a service device 12a-12c is an electronic device that is configured for communication with system 1. For example, a service device 12a-12c may be a computer, a server, a cloud service, a smart phone, a tablet, a smart watch, a smart wearable, an IoT device, or any other suitable device. The service devices 12a-12c do not need to be able to connect to a blockchain so that even devices 12a-12c are conceivable that only have limited computing power or limited network access. For example, a smart switch with a corresponding programming using the ZigBee protocol may be one of the service devices 12a-12c, which is able to connect to system 1 over a corresponding hub, but not to other internet-connected services. In another example, Internet-connected camera with a limited computing power may be used as one of the service devices 12a-12c and may upload data item verification fingerprints of images taken by it. Certainly, not all of the service devices 12a-12c of FIG. 1 need to be of the same type, as should easily be apparent. Similarly, a higher of lower number of service devices 12a-12c may be connected with system 1 at a given time.

Verification database 3 in this embodiment, among other data, stores cryptographic hashes, authentication paths, as well as transaction identifiers, referred to in the following as seal of an associated service data item or "SmartStamp". The verification database 3 in this embodiment is a typical relational database, implemented on a corresponding database server (not shown). Memory 5 of processing device 2 in addition to the mentioned programming also comprises a service data (FIFO) queue, the operation of which will be explained in detail in the following.

Figure 2A:
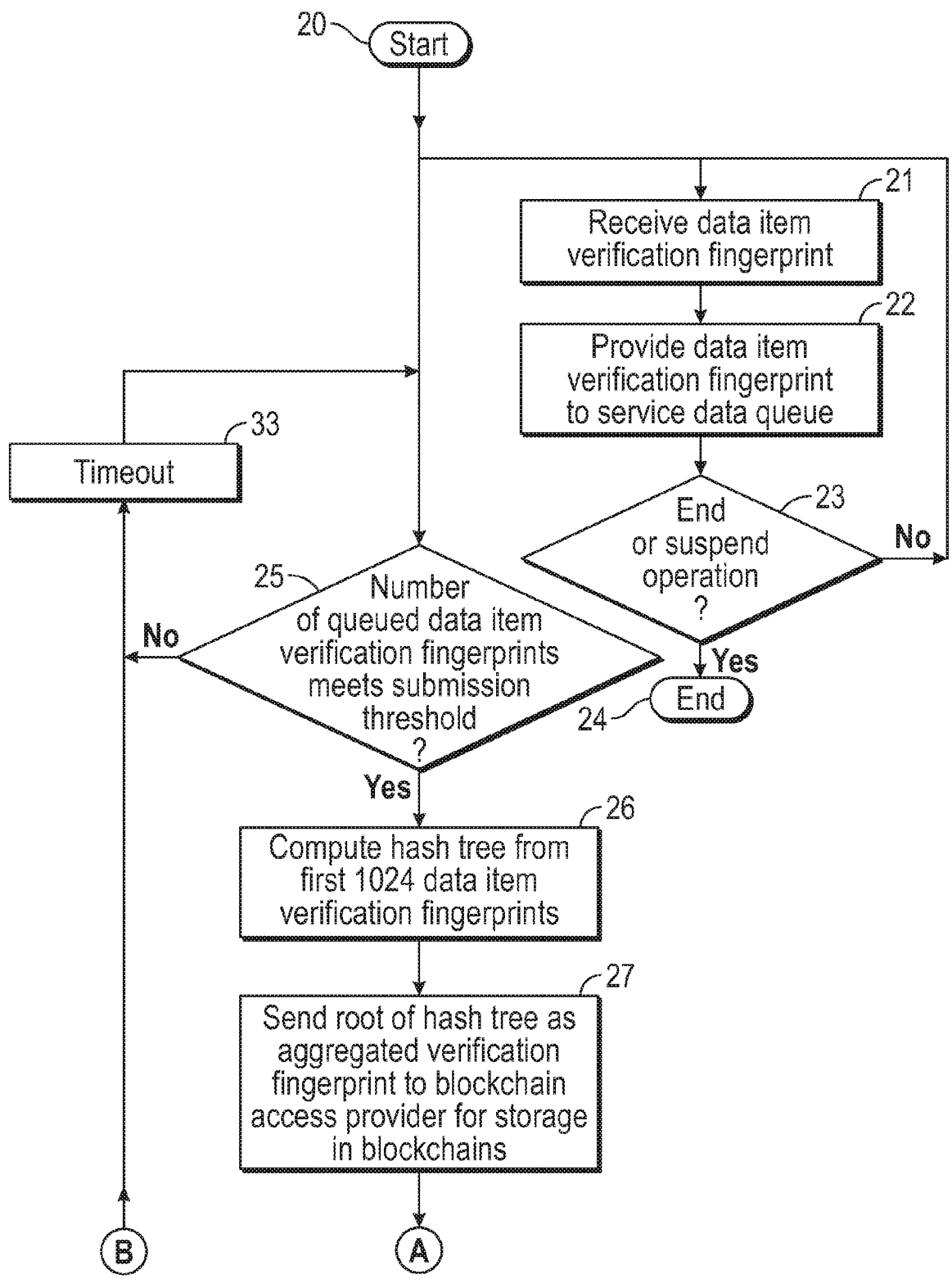
FIGS. 2A and 2B show an embodiment of a method of tamper-evident recording of service data according to the invention in a schematic flow chart.
Figure 2B:
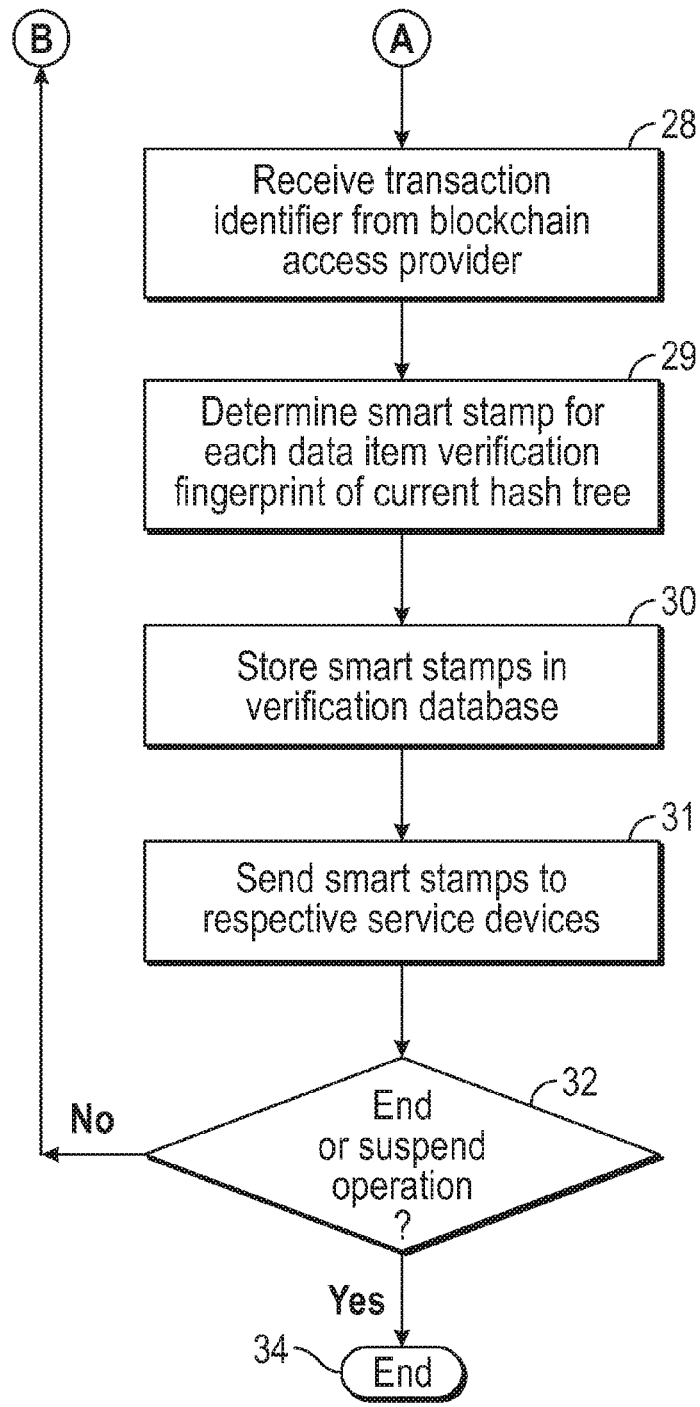

FIGS. 2A and 2B show an embodiment of a method of tamper-evident recording of service data according to the invention in a schematic flow chart. The method of FIGS. 2A and 2B is used by the system 1 of the embodiment of FIG. 1. Correspondingly, reference will be made to the respective components of FIG. 1 when discussing the particulars of FIGS. 2A and 2B.

The method begins with the initialization of system 1 in step 20 by powering on processing device 2 and verification database 3. After initialization, the system 1 conducts two parallel routines, namely a "reception routine" and a "processing routine".

In the reception routine, the system 1 and more precisely service module 7 is set to an active mode. The service module 7 in step 21 then is set to receive data item verification fingerprints from service devices 12a-12c. As discussed in the preceding, the data item verification fingerprints are cryptographic one-way hashes of associated service data items that are to be recorded by system 1. In this embodiment, the hashes are generated using the SHA-256 hash function/algorithm. The hashes may be computed by the service devices 12a-12c or by a third-party device. The data item verification fingerprints are upon reception placed in the service data FIFO queue in step 22. In step 23, it is checked, whether the operator of system 1 would like to terminate or suspend operation. For example, the operator may set a corresponding flag, stored in memory 5, using a web interface when maintenance is needed. The reception routine then ends in step 24. Otherwise, steps 21 through 23 are conducted repeatedly.

Parallel to the reception routine, the processing routine of steps 25-32 is conducted. In step 25, the compression module 8 determines, whether the number of queued data item verification fingerprints of the service data queue meets a certain threshold, for example 1024 entries, i.e., 1024 fingerprints. If this is not the case and after timeout 33, i.e., 5 seconds, step 25 is conducted again.

In case 1024 data item verification fingerprints or more are stored in the service data queue of memory 5, the determination of step 25 results in a positive outcome. Then, in step 26, the first 1024 data item verification fingerprints are loaded from the queue and subsequently are deleted therefrom, as in a typical FIFO queue. The 1024 data item verification fingerprints are then used to compute a Hash tree, namely in this embodiment a binary Merkle Tree (Ralph Merkle, "Secrecy, authentication and public key systems/A certified digital signature", Ph.D. dissertation, Dept. of Electrical Engineering, Stanford University, 1979, and U.S. Pat. No. 4,309,569) to combine all 1024 fingerprints. If the number of fingerprints is not a power of two, it is filled up by dummy fingerprints to the next bigger number of two (padding). Since this however is the case in this embodiment, padding is not needed. The present embodiment uses the SHA-256 algorithm to compute the Merkle Tree.

The number of hashes required to recalculate all hashes along the path (branch node hashes) of the Merkle Tree from the original fingerprint to its root, is of the order $O(\log N)$ where N is the total number of fingerprints to be registered. The root R of the Merkle Tree, in the nomenclature of U.S. Pat. No. 4,309,569, $R=H(1,n,Y)$ is subsequently provided to blockchain connector module 9 as an aggregated verification fingerprint. The use of hash functions advantageously allows to map data of arbitrary length to the root R, which has a fixed length in this embodiment.

The compression module 8 temporarily stores the root R, the branch node hashes, and the 1024 data item verification fingerprints in memory 5.

The blockchain connector module 9 in step 27 subsequently transmits the aggregated verification fingerprint to blockchain access provider 11 over network interface 6. Encryption is advantageously not needed in this communication. Blockchain access provider 11 then stores the aggregated verification fingerprint in blockchains 13a and 13b, i.e., into corresponding transactions of the blockchains 13a and 13b.

Once storing is completed and in step 28, the blockchain access provider 11 provides transaction identifiers back to the blockchain connector module 9. In this embodiment, the transaction identifiers are links to the block and transaction, into which the aggregated verification fingerprint was successfully written. The identifiers furthermore allow to determine the date and time, when the aggregated verification fingerprint was submitted to the blockchain and furthermore when the containing block has been appended to the blockchain and been agreed upon. In the case of Bitcoin, the latter time is on average half of one confirmation interval (or "consensus heartbeat", 10 minutes) later than the actual submission time if the associated transaction fee is high enough to warrant immediate inclusion in a block. Two transaction identifiers are returned in view that the aggregated verification fingerprint was written/stored into two blockchains 13a and 13b.

The two identifiers are in step 29 transferred to the compression module 8, the latter of which then obtains the temporarily stored branch node hashes and the 1024 data item verification fingerprints from memory 5. Once the data is present in compression module 8, so-called "Smart-Stamps" are determined for each of the 1024 data item verification fingerprints. A SmartStamp is a bundle of the hashes, needed to retrospectively verify a certain data item verification fingerprint and thus the underlying service data item. This will be explained in further detail in the following, The SmartStamps thus are electronic "seals" of the respective service data items.

For each SmartStamp, the associated data item verification fingerprint, an authentication path, the transaction identifiers of the current aggregated verification fingerprint, the hash function used, as well as at least one identifier of the blockchain 13a or 13b, i.e., Bitcoin or Hyperledger in this embodiment, are bundled together. Subsequently the respective SmartStamps are stored in verification database 3 in step 30 and transmitted to the service device 12a-12c, from which the respective data item verification fingerprint originated in step 31. It is noted that for each data item verification fingerprint herein, two SmartStamps are determined, in view that two blockchains 13a and 13b are used. Accordingly, a first SmartStamp relates to the Bitcoin blockchain (first blockchain) and a second SmartStamp relates to the Hyperledger blockchain (second blockchain).

In step 32 it is again determined, whether the operator of system 1 would like to terminate or suspend operation. The processing routine then ends in step 34. Otherwise, steps 25 through 33 are conducted repeatedly and multiple aggregated data item verification fingerprints are subsequently stored in the blockchains 13a, 13b.

In the preceding discussed, reference was made to an authentication path. The authentication path, in line with the nomenclature of U.S. Pat. No. 4,309,569, comprises all branch node hashes, that are needed compute the root R for a given data item verification fingerprint. Accordingly, for the above example of an aggregation of 1024 data item verification fingerprints, 1024 corresponding authentication paths are determined.

Figure 3:
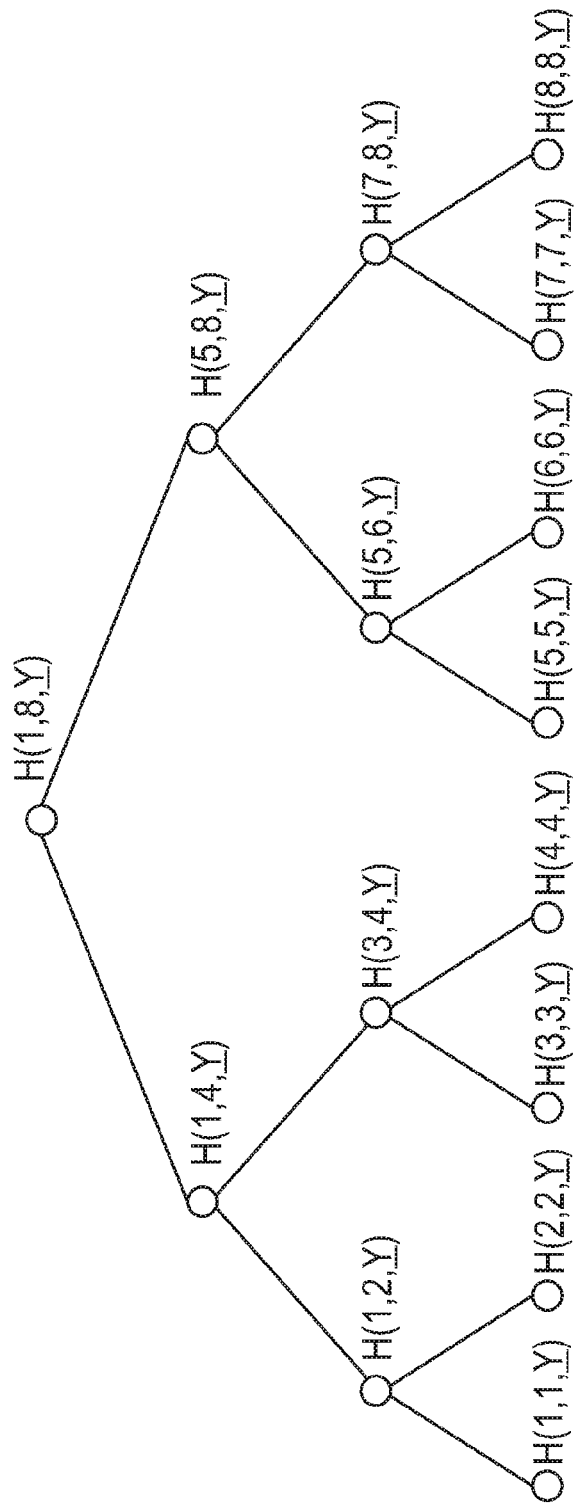
FIG. 3 shows a representation of an exemplary hash tree as used in the embodiment of FIGS. 2A and 2B.

FIG. 3 shows a representation of an exemplary hash tree, as used in the embodiment of FIGS. 2A and 2B. To not unnecessarily obscure the present discussion, an exemplary hash tree for a total of eight data item verification fingerprints are shown. Basis of the formation of the hash tree are eight data verification fingerprints H(1,1,Y), H(2,2,Y), H(3, 3,Y), H(4,4,Y), H(5,5,Y), H(6,6,Y), H(7,7,Y), and H(8,8,Y). As mentioned, these data item verification fingerprints are hashes of their associated service data items, e.g., the respective .pdf file, token, etc.

The compression module 8 in step 26 correspondingly computes a first layer of branch node hashes, namely H(1,2,Y), H(3,4,Y), H(5,6,Y), and H(7,8,Y). As shown, each of these branch node hashes use two data item verification fingerprints as input, hence the term binary hash tree.

Then, a second layer of branch node hashes is computed, namely H(1,4,Y) and H(5,8,Y). Finally, root hash R=H(1,8,Y) is computed. All of the aforesaid hashes herein are calculated using the SHA-256 algorithm.

To later on, i.e., retrospectively, verify a certain service data item, a part of the hash tree can be computed again.

In the exemplary hash tree of FIG. 3 and for a given service data item $Y_1$, the data item verification fingerprint H(1,1,Y) is computed. Then, using the second data item verification fingerprint H(2,2,Y), the branch node hash H(1,2,Y) is computed. Consequently, using H(3,4Y), the second layer branch node H(1,4,Y) is computed. Using H(1,4,Y) and branch node hash H(5,8,Y), root R can be computed.

It follows, that to retrospectively compute the root hash R from service data item $Y_1$, the hashes H(2,2,Y), H(3,4,Y), and H(5,8,Y) are required. These hashes form the aforementioned authentication path, which forms part of the SmartStamp. In particular from FIG. 3, it will be apparent that each data item verification fingerprint has its own authentication path, i.e., its own set of required hashes.

Once the root hash R is computed, one of the blockchains 13a, 13b, is accessed, namely using the transaction identifier of the SmartStamp. This allows retrieving the original aggregated verification fingerprint. In case the original aggregated verification fingerprint matches exactly the root hash R computed for the verification, proof is given that the service data item $Y_1$ was present at the date/time associated with the used transaction identifier.

Figure 9:
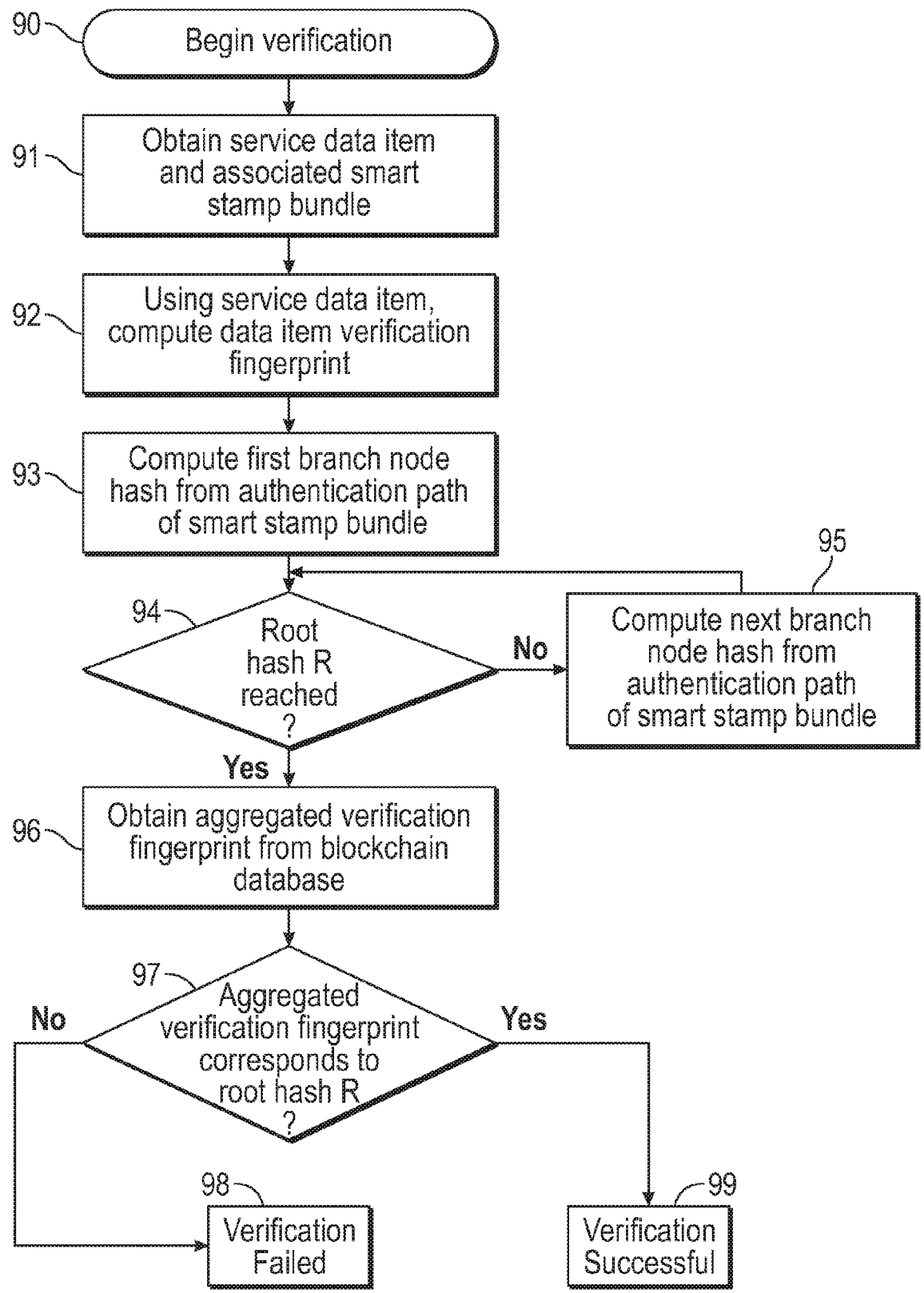
FIG. 9 shows a method of retrospective verification of service data in a schematic flow chart.

FIG. 9 shows a corresponding method of retrospective verification of service data in a schematic flow chart. An exemplary excerpt of a "clear text" SmartStamp that comprises the necessary hashes for the Bitcoin blockchain as well as instructions for a user is shown in FIG. 8.

The method and system of FIGS. 1, 2A, and 2B enables an arbitrary service to record service data items, i.e., arbitrary data, in a tamper-proof way and provides properties inherent to blockchain technology to any type and length of data, thus for any content. The method and system of FIGS. 1, 2A, and 2B therefore is highly scalable and can be used even for large amounts of data, such as entire corporate database systems. It is thus usable for "big data" applications.

The method and system of FIGS. 1, 2A, and 2B can be used with any existing blockchain independent of typical blockchain limiting factors such as transaction throughput or cost. A non-comprehensive list of advantageous properties of the method and system of FIGS. 1, 2A, and 2B is: providing consensus on data items, data items being irrevocable, immutable, durable, authentic, private, and globally visible for the following reasons:
  irrevocable—because of a non-replaceable chain of blocks in a blockchain confirming the one that contains the document's fingerprint,
  immutable—because changing the fingerprint requires changing all following blocks in a blockchain, which is generally computationally infeasible,
  durable—because it can persistently be stored by thousands of blockchain "nodes" worldwide,
  authentic—because it is computationally infeasible to fabricate a different document having the same fingerprint,
  private—because the service data item's contents cannot be reconstructed from its fingerprint, and
  globally visible—because everyone can inquire any of the thousands of nodes of the blockchain worldwide to retrieve the fingerprint.

This way, even if the provider of the system 1 ceases to operate, one can still verify a fingerprint, retaining the value of the original registration. This assumes that the underlying blockchains continues to exist—which currently is more likely for the Bitcoin blockchain than for others.

While desired properties are maintained, limitations of the underlying blockchain are lifted. The number of transactions (e.g. in the example above fingerprints to be stored) provided by the system 1 is independent of the number of transactions to be registered in the blockchains. Millions of data item verification fingerprints can be produced, aggregated, and result in just one blockchain transaction. In particular, transaction throughput is substantially decoupled. A current maximum of seven transactions per second of the Bitcoin blockchain can be turned into thousands or more per second, only depending on the capabilities of the service provider's infrastructure, not on the blockchain.

Also, per-transaction fees for blockchain transactions can be shared among all service data items. So, the higher the number service data items, the lower the per-service-data-item-transaction fees incurred by the use of the blockchain. This enables use of blockchain technology for high-volume low-cost services for example including electronic document "notarization", micropayments, entry access systems, or passport validation.

Figure 4:
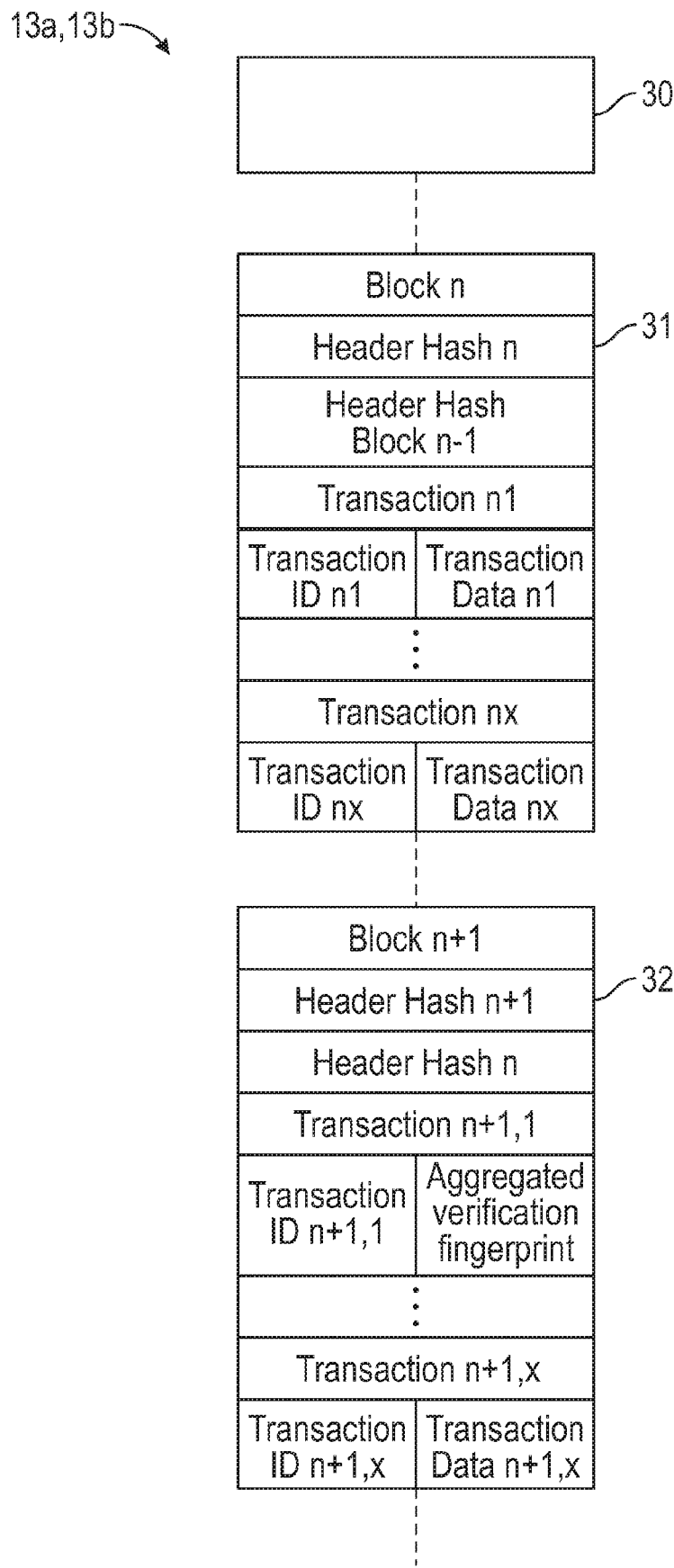
FIG. 4 shows a schematic representation of a block of a blockchain.

FIG. 4 shows a schematic representation of a typical blockchain 13a, 13b. Initiation of the blockchain 13a, 13b starts with a genesis block 30. All subsequently following blocks 31, 32, etc. are cryptographically linked to each other by hashes, stored therein. Each block 31, 32 is stored with a header hash, which is calculated when the block is written. Various methods for calculating the header hash exist in the art.

For example, the header hash may be a hash of the entire block. The next subsequent block expressly includes the header hash of the previous block. In the shown schematic representation of FIG. 4, block 32, i.e., block n+1, includes the header hash of block 31, i.e., block n. Using this setup, it is unfeasible to change the contents of a given block without changing all subsequent (younger) blocks in the chain. This is due to the fact that a change of the block would change the respective header hash, assuming a suitable hash function is used with a sufficiently low collision probability.

Besides the header hashes, each block 31, 32 comprises a plurality of transactions, each comprising a transaction ID and transaction payload/transaction data. As can be seen from FIG. 4, the aggregated verification fingerprint is stored in block n+1 as transaction n+1,1. The associated transaction ID n+1,1 links to the storage position of the aggregated verification fingerprint and comprises the date/time the aggregated verification fingerprint was stored in the blockchain.

Figure 5A:
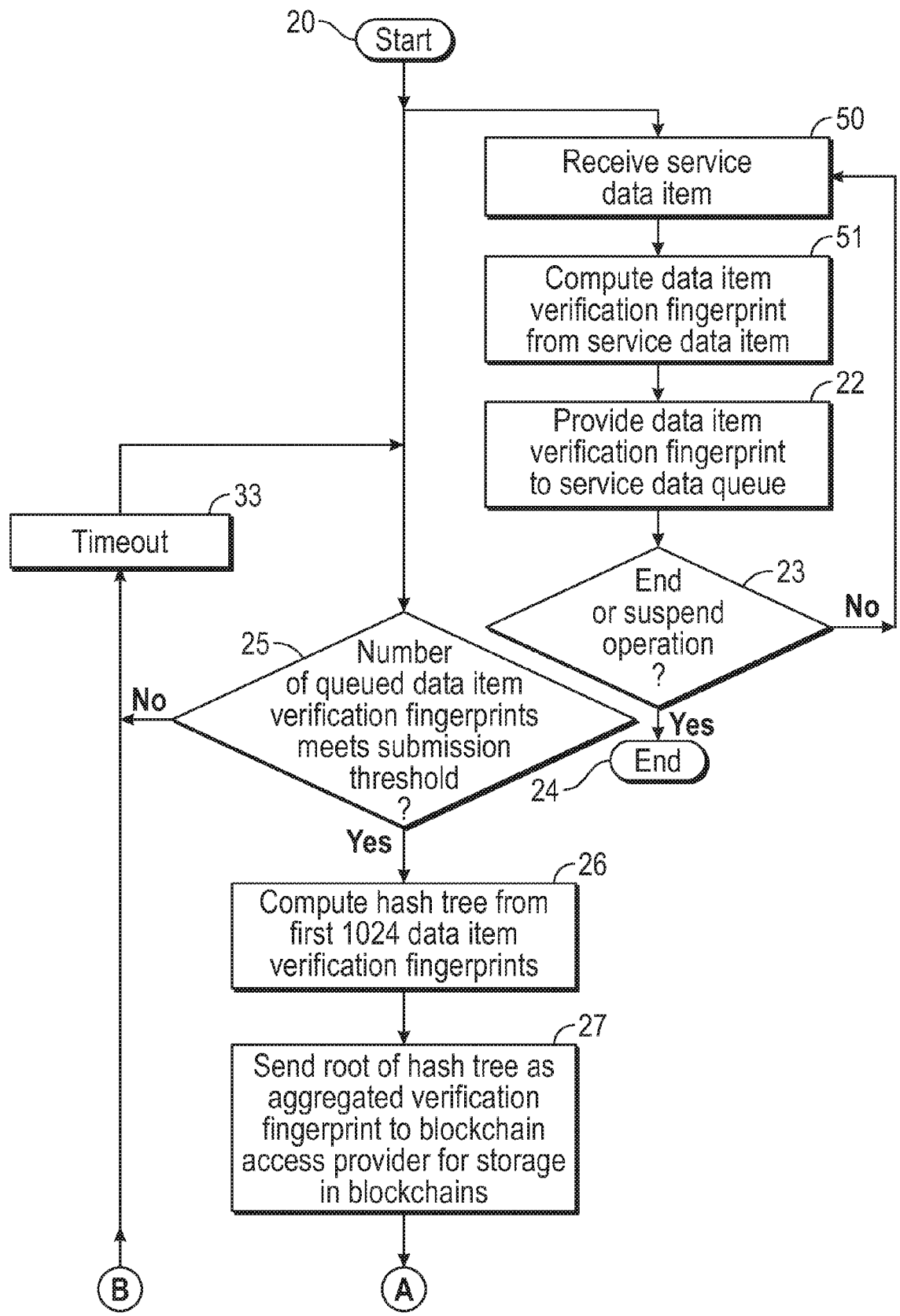
FIGS. 5A and 5B show a second embodiment of a method of tamper-evident recording of service data according to the invention in a schematic flow chart.
Figure 5B:
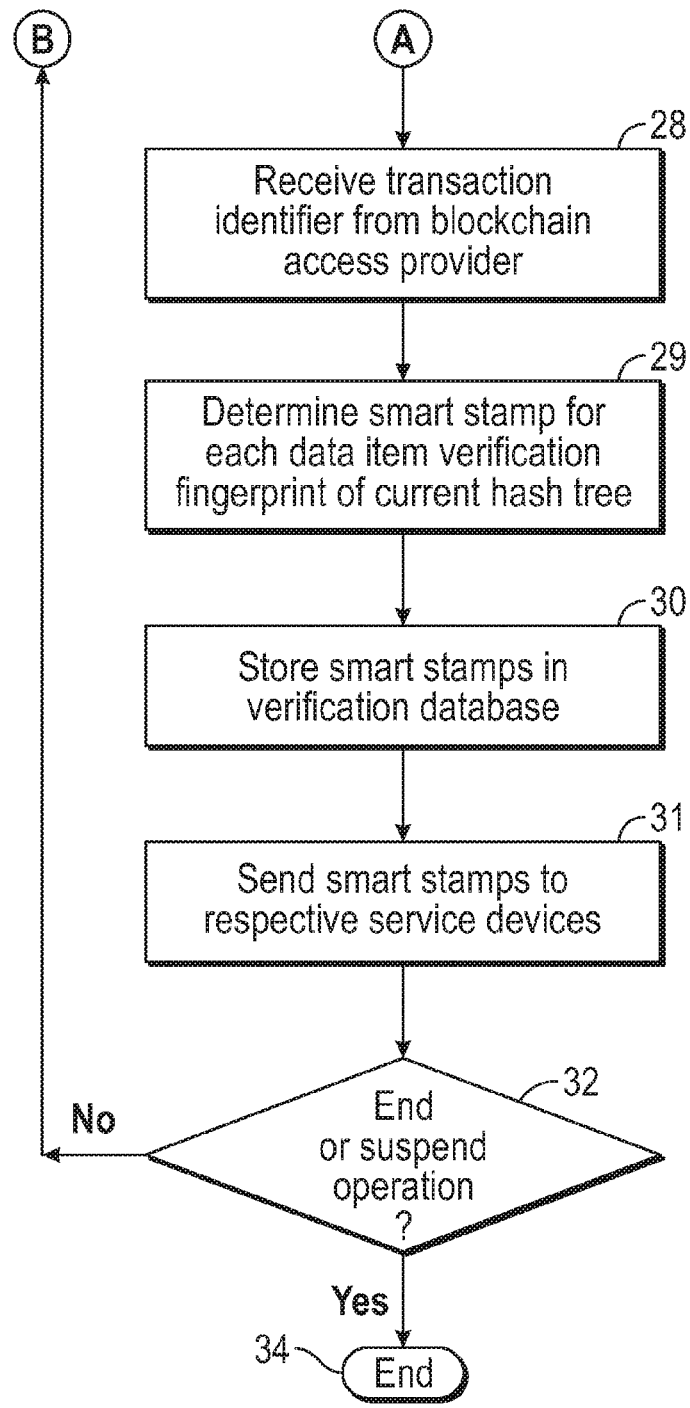

FIGS. 5A and 5B shows a second embodiment of a method of tamper-evident recording of service data according to the invention in a schematic flow chart.

The present embodiment corresponds to the embodiment of FIGS. 2A and 2B with the exception of the operation in the reception routine. In this embodiment, the service devices 12a-12c provide service data items, instead of the data item verification fingerprints to the service module 7. A corresponding service data item is received by the service module 7 in step 50. The service module 7 consequently computes an associated data item verification fingerprint for the received service data item in step 51 using the SHA-256 cryptographic hash function. Corresponding to the embodiment of FIGS. 2A and 2B, the data item verification fingerprint is provided to the service data queue in step 22. The reception routine is repeated as in the embodiment of FIGS. 2A and 2B to subsequently provide a plurality of data item verification fingerprints to the service data queue.

The present embodiment provides that the service devices 12a-12c do not need to compute the data item verification fingerprint on their side, allowing that the service devices 12a-12c may have even less computing power.

Figure 6:
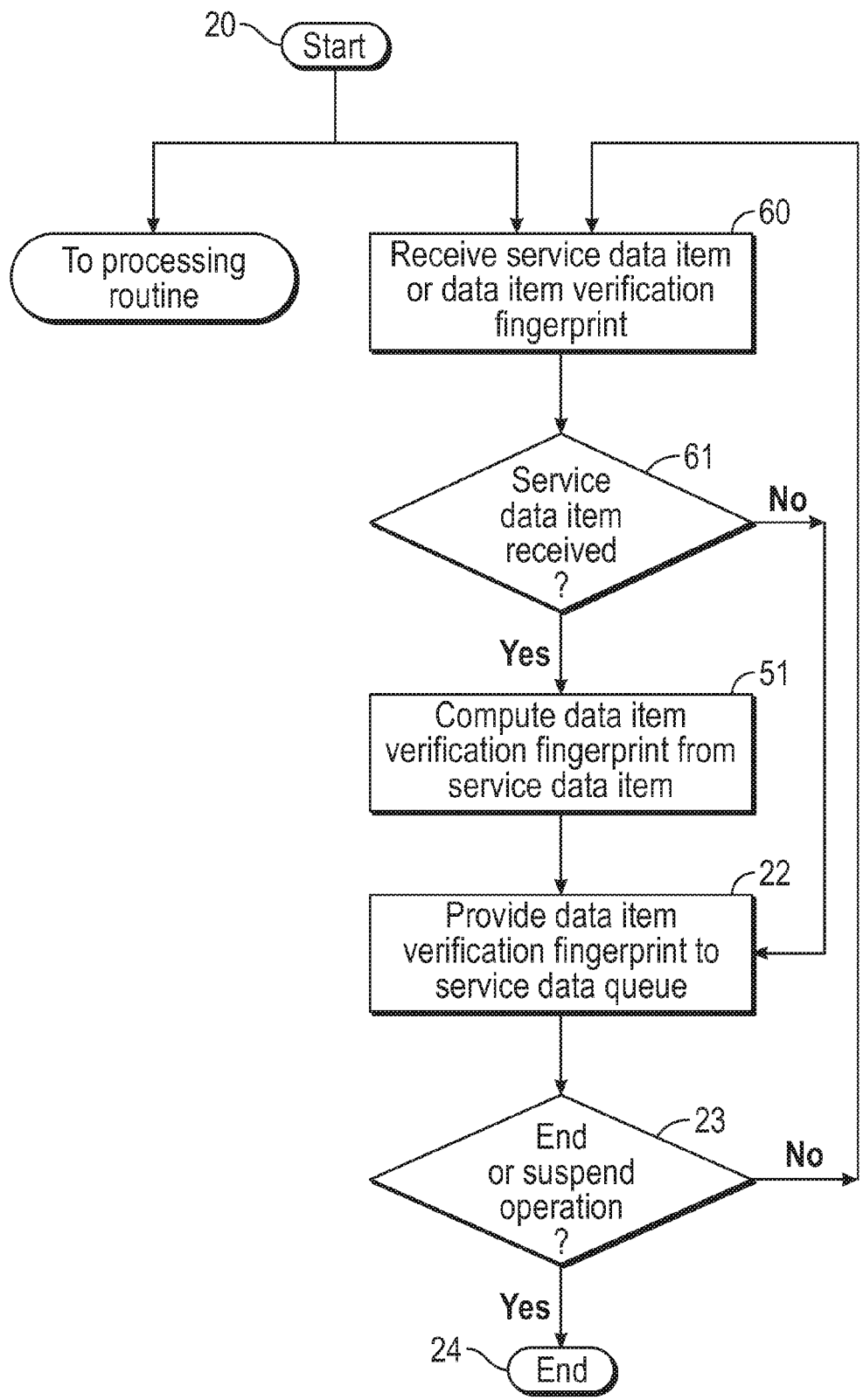
FIG. 6 shows an embodiment of the operation in the reception routine in a schematic flow chart.

Certainly, it is possible that the service module 7 allows for the reception of both, service data items and data item verification fingerprints. A corresponding embodiment of the operation in the reception routine is shown in the schematic flow chart of FIG. 6. It is noted that this reception routine could be employed in all embodiments herein, in particular in the embodiments of FIGS. 2A and 2B, FIGS. 5A and 5B, and FIGS. 7A and 7B.

In step 60 of the reception routine of this embodiment, a service data item or a data item verification fingerprint is received in step 60. Consequently and in step 61, it is determined if a service data item or a data item verification fingerprint was received. The determination is based on a transmission flag, provided by the respective sending service device 12a-12c.

In case a service data item was received, the associated data item verification fingerprint is computed in step 51, as discussed in the preceding with reference to FIGS. 5A and 5B. Otherwise, the routine directly proceeds with step 22 in which the data item verification fingerprint, either the computed one or the received one, is put into the service data queue. The remaining steps and also the processing routine corresponds to the embodiment of FIGS. 2A and 2B.

Figure 7A:
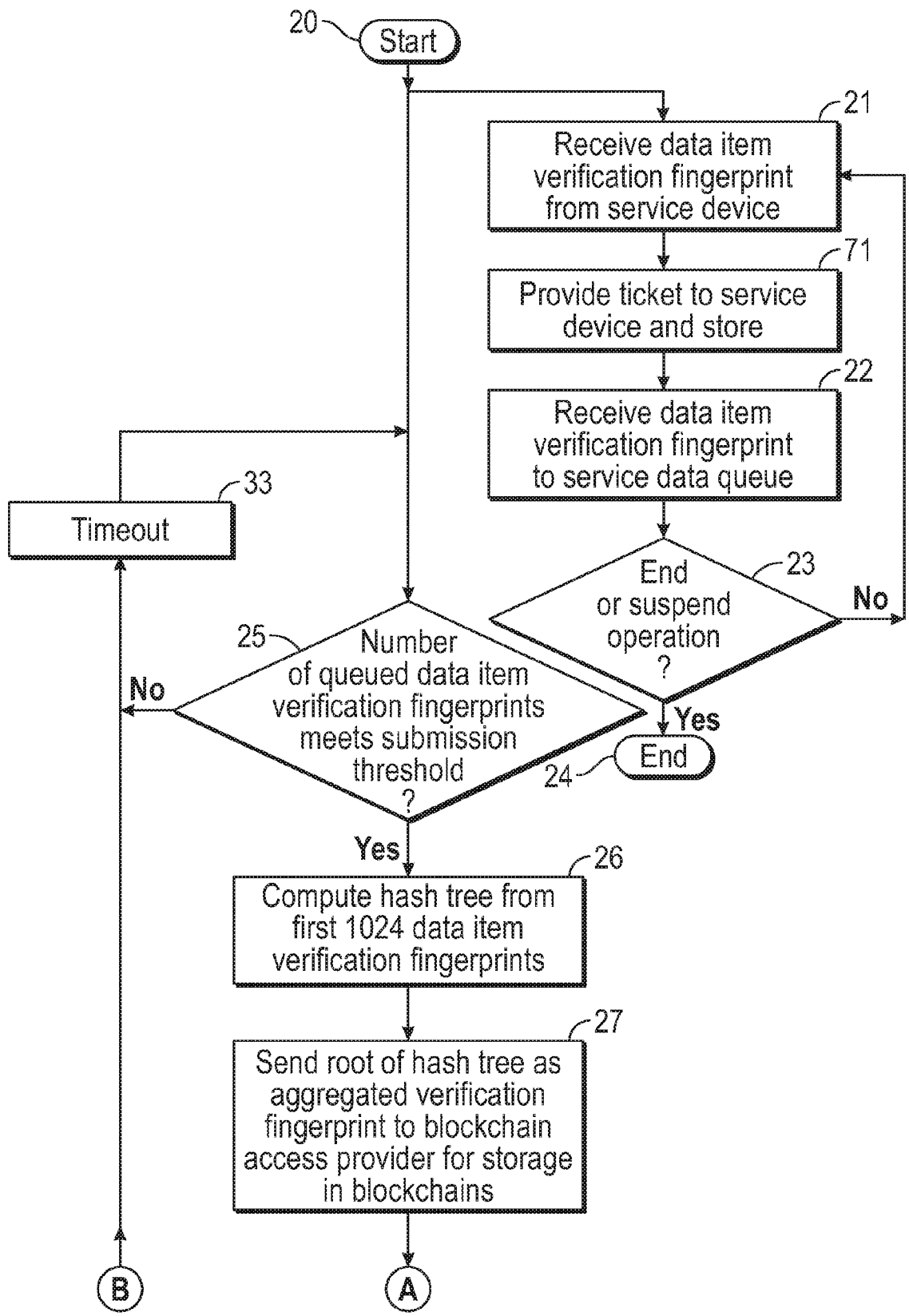
FIGS. 7A and 7B show a further embodiment of a system of tamper-evident recording of service data according to the invention in a schematic block diagram.
Figure 7B:
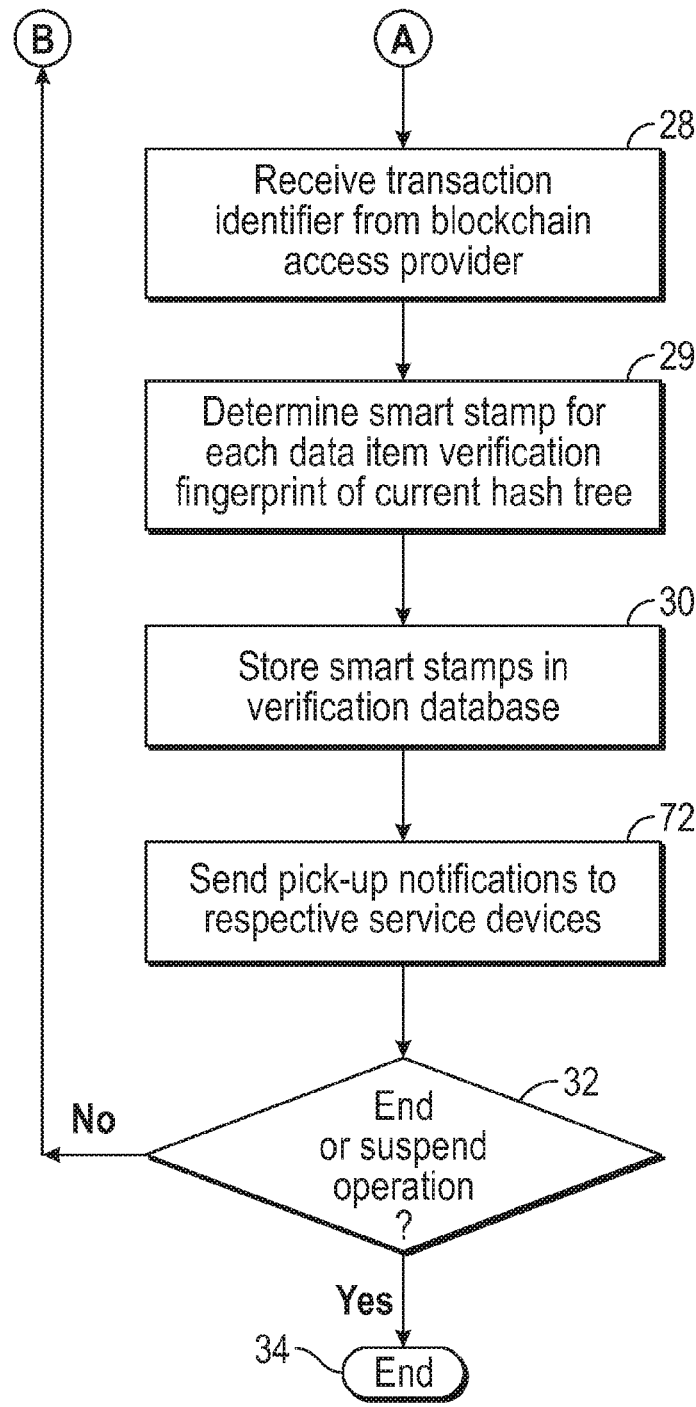

FIGS. 7A and 7B show a further embodiment of a system of tamper-evident recording of service data according to the invention in a schematic block diagram. The embodiment of FIGS. 7A and 7B correspond to the embodiment of FIGS. 2A and 2B with the exception of steps 71 and 72. In step 71 and thus after a data item verification fingerprint has been received from a service device 12a-12c in step 21, the service module 7 generates and provides an individual ticket back to the respective service device 12a-12c. The ticket in this embodiment is randomly generated 256 bit data that is associated with the respective data item verification fingerprint. The ticket is also temporarily stored together with the respective data item verification fingerprint and an origination ID, pointing to the service device 12a-12c that provided the data item verification fingerprint, in memory 5.

Issuing a ticket instead as the immediate result of submitting a service data item or its fingerprint eases the submitter's task of keeping track of the item. This is due to invariances in processing times by both the bundling heuristics and the underlying blockchain. When a data item is submitted, typically both are unknown. The former may depend on reaching a certain threshold as in step 25 which in turn depends on other submitters. The latter depends on the acceptance of the transaction containing the aggregated fingerprint as a new block and also on how many blocks are added after that block. By using a ticket, a submitter can simply repeatedly ask whether one or all SmartStamps are available, typically one per underlying blockchain, and when they become available then store them and discard the ticket. Alternatively, a submitter may be asynchronously notified of one or more SmartStamps being available. That way, all potential difficulties with respect to bundling and/or the underlying blockchain(s) stay hidden from a service user and eventually a conclusive proof is delivered.

After the aggregated verification fingerprint has been stored in the blockchains 13a, 13b in step 27 and the respective transaction identifiers have been received from the blockchain access provider 11 in step 28, the SmartStamps for each data item verification fingerprint of the current processing run are determined again in step 29.

Each SmartStamp in this embodiment comprises the authentication path, necessary for retrospective verification of the respective data item verification fingerprint, the transaction identifiers of the current aggregated verification fingerprint, identifiers of the two blockchains 13a, 13b, i.e., Bitcoin or Hyperledger, and the hash function used. Each SmartStamp is then correlated with the ticket of the respective underlying data item verification fingerprint, obtained from memory 5.

Subsequently the respective SmartStamp is stored in verification database 3 in step 30. Then, the service module 7 sends a "pick-up" notification to the service devices 12a-12c in step 72 according to the stored origination IDs stored in memory 5. The service devices 12a-12c may then, or at a later point, obtain the SmartStamp by sending a request for transmission of the SmartStamp, comprising the respective ticket ID, to system 1.

FIG. 9 shows a method of retrospective verification of service data in a schematic flow chart. Such verification could be conducted at any time after the generation of a SmartStamp for a given service data item Y by the processing routine of the preceding embodiments. In this example, it is assumed that the verification is conducted by a third-party verification device or service. However, the verification could certainly also be conducted by system 1 or one or the service devices 12a-12c.

In step 91, the respective service data item Y1 to be verified is obtained, i.e., received by the verification device or obtained from a storage unit. In addition, the SmartStamp, associated with the service data item Y1 is obtained, i.e., received by the verification device, obtained from a storage unit, or obtained from verification database 3 using the ticket of the embodiment of FIGS. 7A and 7B. As mentioned, the SmartStamp is a bundle and comprises information on the hash function used, the authentication path for the respective service data item, transaction identifiers, and identifiers of the blockchain 13a or 13b. As the aggregated bundle of service data items usually varies with the underlying blockchain, its average confirmation time and other properties, in general the authentication paths for the same service data item but different blockchains differ. Consequently, in effect, one SmartStamp per underlying blockchain may be delivered.

In step 92, the verification device computes the data item verification fingerprint $H(1,1,Y)$ using the service data item Y1 and the hash function according to the SmartStamp.

In step 93 and using the data item verification fingerprint obtained in step 92 and the first hash of the authentication path, stored in the SmartStamp, the verification device computes the first branch node hash $H(1,2,Y)$ of the hash tree. In step 94, it is determined whether the root hash R has been reached. In this example, the verification device checks whether the authentication path of the SmartStamp comprises further hashes. If this is the case and in step 95, the verification device computes the next branch node hash $H(1,n,Y)$ using the branch node hash obtained last, i.e., $H(1,2^{n-1},Y)$ and the next hash of the authentication path. The number of iterations certainly depend on the size of the hash tree and thus, the number of data item verification fingerprints that are mapped to the associated aggregated verification fingerprint.

Once the root hash R has been reached and in step 96, the verification device queries the blockchains 13a, 13b according the SmartStamp, to provide the transaction data associated with the transaction ID of the SmartStamp. The verification device in this step could, e.g., contact the blockchain access provider 11 of FIG. 1 or connect to the blockchains 13a, 13b directly.

Certainly, while it would be sufficient to contact one of the blockchains 13a, 13b, for increased certainty, both are contacted in this embodiment. In step 97, it is determined, whether the two aggregated verification fingerprints, obtained from blockchains 13a, 13b, correspond to the root hash R, just calculated.

If this is the case, verification of the service data item then concludes successfully in step 99. The service data item was verifiably present on the date/time of the transaction ID, stored in the SmartStamp. If not, the verification of the service data item has failed in step 98. In both cases, the present verification routine then ends and informs its user of the result.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment in which:
- the verification database 3 is formed integrally with the processing device 2,
- modules 7-9 are not provided solely by programming, but by dedicated (hard-wired) circuitry,
- the service data items each comprise one or more of the group of electronic documents, image data, generic tokens, asset tokens, and digital currency tokens;
- at least some of the service data items being digital currency tokens of a virtual currency or a cryptocurrency;
- instead of the compression module 8 using the SHA-256 algorithm, the compression module 8 is configured to use a different hashing algorithm, such as one of MD5, SHA-3, SHA-2, SHA-1, BLAKE, and BLAKE2;
- instead that the compression module 8 forms an aggregated verification fingerprint when a number of 1024 data item verification fingerprints are in the queue, the compression module 8 uses a smaller or larger numerical threshold, possibly millions of items, or other parameters for a heuristics to anchor a bundle in a blockchain such as an expired timeout, exceeding the average confirmation time of the underlying blockchain, submitters having increased or decreased priority, urgency of service data items, etc.;
- instead that the compression module 8 forms an aggregated verification fingerprint when a number of 1024 data item verification fingerprints are in the queue, the compression module 8 forms an aggregated verification fingerprint when a certain time has passed since the last aggregated verification fingerprint was formed (timeout); and/or
- instead that the compression module 8 forms an aggregated verification fingerprint when a number of 1024 data item verification fingerprints are in the queue, the compression module 8 forms an aggregated verification fingerprint every given time event, i.e., every day or hour, etc.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims or mutually different embodiments does not indicate that a combination of these measured cannot be used to advantage. In contrast, several combinations of embodiments or further embodiments comprising features of different embodiments are conceivable.

A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

APPENDIX I

The presented invention applies to services electronically rendered by computers, e.g. servers running in data centers, over a transport network, for instance the internet, to users or their devices, e.g. submitting and viewing information on terminals or other devices, e.g. web browsers on personal computers or mobile phones.

In the year 2008, a system and algorithm has been presented for an electronic cash system (Satoshi Nakamoto, "Bitcoin: A Peer-to-Peer Electronic Cash System", https://bitcoin.org/bitcoin.pdf). Its underlying foundation, the blockchain, enables distributed consensus without necessarily requiring trust. Consensus can be achieved on whether a certain data item has been presented at a given time. Originally, this was intended to publicly register electronic cash transfers and to prevent anyone from spending cash amounts more than once without requiring a central authority. However, as arbitrary data items can be registered, the blockchain provides a worldwide public ledger that can be used for purposes other than cash transfers, too.

Due to the way the Bitcoin blockchain is constructed, its transaction throughput is limited, to a worldwide total of about 7 transactions per second at the time of this writing, and incurs cost to reimburse those operating the infrastructure. This led to other parties offering alternative technologies and blockchain implementations based on the same principles but trying to overcome the original blockchain's limitations. As a lot of financial investment and work has been put into the original Bitcoin blockchain, it still is by far the most widely used and most trusted blockchain and will remain so for the foreseeable future.

Here, a method and system is presented that decouples an arbitrary service offering from those limitations while maintaining the underlying blockchain's asserted properties.

The invented method and system decouples services based on blockchain technology from the limitations of the underlying blockchain, in particular from its transaction throughput and implied cost, while retaining its desirable properties.

FIG.: "Example Printout for Recalculating a Fingerprint" shows how verification of one fingerprint out of an aggregated set of fingerprints can be performed from printed instructions.

The presented method and system enables an arbitrary service that aims at offering properties inherent to blockchain technology to be based on (a) any existing blockchain and (b) independent of its limiting factors such as transaction throughput or cost. A non-comprehensive list of those properties is: Providing consensus on data items, data items being irrevocable, immutable, durable, authentic, private, and globally visible.

An example case for such a service may be replacing or augmenting a public agent notarizing a document by an automated service doing so. If the document is not yet available in electronic form, it can be scanned of photographed. For instance, the country of Estonia offers such a do-it-yourself service based on blockchain technology to notarize marriages, contracts, birth certificates and more.

Such a service can be implemented by creating a fingerprint of the document, for instance the bitwise representation of an image of a contract including signatures, by calculating a cryptographic one-way hash function of its bitwise contents. This fingerprint, a bit string of fixed size independent from the size of the original document, is then registered in the blockchain together with a timestamp. At a later point in time, when evidence of the existence of the original document is requested, the then presented electronic document is hashed again and that hash is compared to the one registered in the blockchain to find out whether the two are equal. If that is the case, it demonstrates that the document as presented now was present back then at the time of the timestamp in the blockchain and that its contents is unchanged. Due to the nature of the blockchain, this electronic notarization has the properties of (in the order mentioned above) being

- irrevocable—because of a non-replacable chain of blocks confirming the one that contains the document's fingerprint,
- immutable—because changing the fingerprint requires changing all following blocks, which is computationally infeasible,
- durable—because it is persistently stored by thousands of blockchain "nodes" worldwide,
- authentic—because it is computationally infeasible to fabricate a different document having the same fingerprint,
- private—because the document's contents cannot be reconstructed from its fingerprint, and
- globally visible—because everyone can inquire any of the thousands of nodes worldwide to retrieve the fingerprint.

Apart from those desirable properties, such a service is also limited by its underlying blockchain. If, for example, evidence of the document should hold up in court, one plausible candidate at the time of this writing in 2016 would be the Bitcoin blockchain because through it being the foundation of the Bitcoin currency it has proven to be accepted and trusted by parties that would otherwise not trust each other at all. In addition, it is used by millions of people on a daily basis trading real substantial monetary value. So, a court is more likely to accept evidence based on such a proven technology. However, the notarization service would also inherit its limitations, in particular, a maximum of only 7 transactions per second globally, which are shared among all services, among them Bitcoin transfers itself, compared to about 4000 transactions per second required for just one credit card processor, Visa Inc. In addition, the registration in the blockchain implies fees for that transaction which might be acceptable for the low frequency of notarization of documents per individual such as birth certificates but not for use cases such as entry access systems, i.e., electronic keys, which would incur that cost each time when stepping through a door.

Instead of registering each individual fingerprint, fingerprints are aggregated, then at a time of the system's choosing combined into a single fingerprint and then this single fingerprint is registered.

Aggregation of fingerprints can occur in a variety of ways, for instance, concatenating all fingerprints into a bit stream and hashing it. The presented system, however, uses a Merkle Tree (Ralph Merkle. "Secrecy, authentication and public key systems/A certified digital signature". Ph.D. dissertation, Dept. of Electrical Engineering, Stanford University, 1979.) to combine all fingerprints. If the number of fingerprints is not a power of two, it is filled up by dummy fingerprints to the next bigger number of two.

The number of hashes required to recalculate all hashes along the path of the Merkle Tree from the original document or its fingerprint to its root which in turn is registered in the blockchain, is of the order $O(\log N)$ where N is the total number of fingerprints to be registered within one blockchain transaction. So, using this scheme permits to easily calculate the (few) hashes required to verify a fingerprint. At each step starting from the leaf, the hash of the previous step needs to be appended or prepended to the hash of the current step and then hashed again until the root is reached.

This way, even if the provider of the service ceases to operate, one can still verify a fingerprint, retaining the value of the original registration. This assumes that the underlying blockchain continues to exist—which currently is more likely for the Bitcoin blockchain than for others, which in turn provides yet another reason for using the presented system instead of a custom-made not widely used proprietary blockchain.

An example of how the presented system produces a human readable text to verify a document and recalculate the registered fingerprint can be seen in FIG. 1: "Example Printout for Recalculating a Fingerprint".

All the properties above remain intact, and this is for the same reasons that they existed in the first place. For instance, the root of the Merkle Tree is registered in the blockchain. So, it is irrevocable and immutable as was just a single fingerprint. It is durable and globally visible because the root stays in the replicated blockchain and the path to verify it is both stored in the system providing the service and in the email or printout shown in the FIG: "Example Printout for Recalculating a Fingerprint", which at the choice of the user can be published any way he or she chooses. It is authentic because it is at least as difficult to produce an alternate document matching the same fingerprint as it was before.

In particular, privacy is guaranteed. The contents of the document remain private because its contents are neither stored nor published and it is not possible to reconstruct it from its fingerprint. This provides a high level of privacy. Even if the service provider's systems are compromised, only fingerprints could be stolen. Which is fine, because they have already been published anyways.

While desired properties are maintained, limitations of the underlying blockchain are lifted. The number of transactions (e.g. in the example above fingerprints to be stored) provided by the service (notarization in the example above) is independent of the number of transactions to be registered in the blockchain. Millions of document fingerprints can be produced, aggregated, and result in just one blockchain transaction. In particular, transaction throughput is completely decoupled. 7 transactions per second of the Bitcoin blockchain can be turned into thousands or more per second, only depending on the capabilities of the service provider's infrastructure, not on the blockchain.

Also, per-transaction fees for blockchain transactions are now shared among all service transactions. So, the higher the number of service transactions, the lower the per-service-transaction fees incurred by the use of the blockchain. This enables use of blockchain technology for high-volume low-cost services like micropayments or entry access systems or passport validation.

Use of the presented system will also increase acceptance by the providers of the underlying blockchain infrastructure. The blockchain is no longer cluttered by many transactions specific to the newly provided service. Instead, mapping of service transactions to blockchain transactions can be arbitrarily throttled in order to result in a low number and low frequency of blockchain transactions. In the case of the Bitcoin blockchain, while insertion of zero-value transactions using the specific opcode OP_RETURN is possible, its excessive use is frowned upon by some members of the community because it consumes blockchain space but does not represent a Bitcoin transfer.

Decoupling the service from the underlying blockchain also enables its execution on devices that do not have or are not capable of having direct access to the blockchain. For instance, a separate device might gather data that then is forwarded to a server immediately or at a later time running the invented system that in turn maps it, at a different time and possibly together with data from other devices to a blockchain transaction.

The presented invention has been verified by the inventor for technical feasibility by implementing and running a prototype system.

The inventions set forth above are subject to many modifications and changes without departing from the spirit, scope or essential characteristics thereof. Other embodiments of this invention will be obvious to those skilled in the art in view of the above disclosure. Thus, the embodiments explained above should be considered in all respect as being illustrative rather than restrictive of the scope of the inventions as defined in the appended items.

1. A method for decoupling services based on blockchain technology from the limitations of the underlying blockchain while retaining its desirable properties.
2. The method of item 1, wherein throughput of transactions of the offered service are independent from blockchain transactions.
3. The method of item 2, wherein the presented system can arbitrarily choose how many service transactions are mapped to a blockchain transaction.
4. The method of item 2, wherein the presented system can arbitrarily choose how often aggregated service transactions result in creating a blockchain transaction.
5. The method of item 1, wherein the implied cost of a blockchain transaction is shared among the arbitrarily chosen number of service transactions mapped to it.
6. The method of item 1, wherein the service may also be executed on devices that do not have or are not capable of having direct access to the blockchain.
7. The method of item 1, wherein service transactions are combined to a single blockchain transaction.
8. The method of item 7, wherein combination of service transactions are in the form of a Merkle tree.
9. The method of item 7, wherein verification is performed by resubmitting a document or its fingerprint to the presented system.
10. The method of item 7, wherein verification can be performed by using only printed instructions without the need of the presented system being accessible.
11. The method of item 1, wherein only fingerprints or hashed representations of documents are stored and thus an attack of the presented system aiming at disclosing documents is rendered pointless.

The invented method and system decouples services based on blockchain technology from the limitations of the underlying blockchain, in particular from its transaction throughput and implied cost, while retaining its desirable properties.

FIG.: "Example Printout for Recalculating a Fingerprint"
Dear SealWitness user,
proof of the document that you uploaded at 2016-08-01 02-38-46 UTC
has been successfully registered in the worldwide public ledger, the blockchain.
You are now all set.
In particular, you now are in a position to be able to prove at any time to anyone
that you submitted your document and that it remained unaltered by using our verification service at
    https://www.sealwitness.com:443/sealwitness.web/verify.jsp?docRetrievalId=ri173b79f8e171c195b90650cb24b236666dc62ffff65e622d1319b5fd04887b208
Thank you for using our service,
Your SealWitness Team
P.S.: Alternatively, in case that you are legally or technologically interested,
you could perform the verification all by yourself, even without using our service.
Here are the instructions:
Use SHA-256 to calculate a hash of your document, for instance by running
    openssl dgst -sha256 -hex your_document
The SHA-256 hash of the submitted document was 73b79f8e171c195b90650cb24b236666dc62ffff65e622d1319b5fd04887b2 08.
Then take that hash 73b79f8e171c195b9-0650cb24b236666dc62ffff65e622d1319b5fd04887b2 08 and append 3e21d24dfbf0a35-7fb4aa18e71670c8b941395c09b219028595f0b9c76c22c ae to it.
Then calculate SHA-256 of the concatenation of the two, which is
58d4a5616ef6644054753901be30e54fa3ef3fb45b93c3-58a26178661ff7f6ca.
Then take that hash 58d4a5616ef66440-54753901be30e54fa3ef3fb45b93c358a26178661ff7f6ca and append c1c1f73cdb819a953da-857344e8e67ad3fa0546b35343a1023388bc51fac92 0f to it.
Then calculate SHA-256 of the concatenation of the two, which is
527383779461ffd0924a415e9d24a-e9e7a7fc76e55f1b79b5950f269c273f0ab.
Then take that hash 527383779461ffd0924a415e9-d24ae9e7a7fc76e55f1b79b5950f269c273f0ab and append 69481793495bdcc8b4a425c330c22cc4460b250f0c-9142b2d53ed094cde3a9d3 to it.
Then calculate SHA-256 of the concatenation of the two, which is
493af06e912d2bbba2-7231a7b8245cfdde229f97797cc10a0672d03cddc871ae.

Then take that hash 493af06e912d2bb-ba27231a7b8245cfdde229f97797cc10a0672d03cddc871ae and append b5e2093104ae051d1cbd3-6cede74e1c7237262fb79eaa8d5eebda7306a9598 20 to it.
Then calculate SHA-256 of the concatenation of the two, which is
923188377359563ca6fcf7c620d2e-3d106cfb4098c82e4cdf8c452b40b5333 6d.
This is the value which you will find publicly available in the blockchain named 'btc.test'
in transaction id=669bc832d35ff64a-d481a49dacac95326dd1c48b38a953fff77ba35993f 0e04e having been inserted there at 2016-08-01 02-40-15 UTC in section "vout"/n=0/"scriptPubKey"/"hex" as the sixth and following bytes.
In case you run a full node with option txindex=1 and are using the standard Bitcoin command line interface,
you might want to run
   bitcoin-cli getrawtransaction 669bc832d35ff64ad481a49daca-c95326dd1c48b38a953fff77ba35993f0e0 4e 1
Or you can take a look here:
https://www.blocktrail.com/tBTC/tx/
669bc832d35ff64ad481a49daca
c95326dd1c48b38a953fff77ba35993f0e04e or
   https://testnet.blockexplorer.com/tx/
669bc832d35ff64ad481a49dacac95326dd1c48b-38a953fff77ba35993f0e04e or
   https://tbtc.blockr.io/tx/info/
669bc832d35ff64ad481a49dacac9
5326dd1c48b38a953fff77ba35993f0e04e or
   https://live.blockcypher.com/btc-testnet/tx/
     669bc832d35ff64ad481a49dacac95326dd1c48b3-
     8a953fff77ba35993f0e04e
at the first "Output Scripts" entry at bytes four and following after OP_RETURN.
End of APPENDIX I

What is claimed is:

1. A computer-implemented method of tamper-evident recording of a plurality of service data items, each service data item being associated with a data item verification fingerprint, wherein a processing routine is conducted, in which
   an aggregated verification fingerprint is computed from at least a plurality of data item verification fingerprints using at least one one-way compression function, so that the aggregated verification fingerprint has a bit length, which is less than a bit length of a concatenation of the data item verification fingerprints; and wherein
   the aggregated verification fingerprint is stored in a plurality of blockchains for decoupling the storage of the aggregated verification fingerprint from the service data items;
   the step of computing the aggregated verification fingerprint comprises computing a hash tree from the plurality of data item verification fingerprints;
   for at least a first data item verification fingerprint of the plurality of data item verification fingerprints, a first authentication path comprising one or more hashes and a second authentication path comprising one or more hashes is determined in the hash tree, which first authentication path is associated with a branch path from the first data item verification fingerprint to the root hash in a first blockchain in which the aggregated verification fingerprint is stored, and which second authentication path is associated with a branch path from the first data item verification fingerprint in a second blockchain in which the aggregated verification fingerprint is stored;
   the one or more hashes of said first authentication path are stored in a verification database;
   the aggregated verification fingerprint is stored in at least a first block of the plurality of blockchains, wherein an identifier of the first block is stored in the verification database; and
   the first data item verification fingerprint is stored in the verification database with the one or more hashes of said first authentication path and is correlated with the one or more hashes of said first authentication path.

2. The method of claim 1, wherein the plurality of service data items is not stored in said at least one blockchain.

3. The method of claim 1, wherein the plurality of data item verification fingerprints is not stored in said at least one blockchain.

4. The method of claim 1, wherein the aggregated verification fingerprint is stored in a plurality of forked blocks of one or more blockchains.

5. The method of claim 1, wherein the processing routine is conducted repeatedly to subsequently store a plurality of aggregated verification fingerprints in the plurality of blockchains.

6. The method of claim 1, wherein the hash tree is a binary tree, a tertiary tree, or a higher order tree.

7. The method of claim 1, wherein the step of computing the aggregated verification fingerprint comprises computing a plurality of hash trees from the verification data item fingerprints, wherein at least a first hash tree is computed using a first cryptographic hash function and a second hash tree is computed using a second cryptographic hash function, wherein the first and second cryptographic hash functions differ from each other.

8. The method of claim 1, wherein the computing of the hash tree comprises computing of a root hash and one or more branch node hashes.

9. The method of claim 1, wherein the aggregated verification fingerprint comprises at least the root hash of the hash tree.

10. The method of claim 1, wherein at least one or more hashes of said first authentication path are transmitted to a service device.

11. The method of claim 1, wherein the aggregated verification fingerprint is stored in at least a first block of the plurality of blockchains, wherein an identifier of the first block is transmitted to one or more service devices, associated with the plurality of service data items.

12. The method of claim 1, wherein the plurality of service data items are received; and for each received service data item, an associated data item verification fingerprint is computed using a fingerprint function.

13. The method of claim 1, further comprising verifying the stored aggregated verification fingerprint in the plurality of blockchains.

14. The method of claim 1, wherein the plurality of service data items each comprise one or more of the group of electronic documents, image data, generic tokens, asset tokens, and digital currency tokens.

15. A non-transitory computer-readable medium including contents that are configured to cause a processing device to conduct the method of claim 1.

16. A system of tamper-evident recording of service data, comprising at least a processing device, the processing device comprising:

a network interface, configured to connect to a communication network for sending and receiving data;

a service module, connected with the network interface and configured to receive a plurality of service data items and for each service data item, to compute an associated data item verification fingerprint using a fingerprint function;

a compression module, configured to compute an aggregated verification fingerprint from at least a plurality of data item verification fingerprints using at least one one-way compression function, so that the aggregated verification fingerprint has a bit length, which is less than a bit length of a concatenation of the data item verification fingerprints; and a blockchain connector module, connected with the compression module and the network interface and configured to connect with a plurality of blockchains and to transmit the aggregated verification fingerprint to the plurality of blockchains to allow storing the aggregated verification fingerprint in the plurality of blockchains decoupled from the service data items;

wherein the compression module is further configured to compute the aggregated verification fingerprint through computation of a hash tree from the plurality of data item verification fingerprints;

wherein for at least a first data item verification fingerprint of the plurality of data item verification fingerprints, a first authentication path comprising one or more hashes and a second authentication path comprising one or more hashes are determined in the hash tree, which first authentication path is associated with a branch path from the first data item verification fingerprint to the root hash in a first blockchain in which the aggregated verification fingerprint is stored, and which second authentication path is associated with a branch path from the first data item verification fingerprint in a second blockchain in which the aggregated verification fingerprint is stored;

wherein the blockchain connector module is further configured to:

store the one or more hashes of said first authentication path in a verification database;

store the aggregated verification fingerprint in at least a first block of the plurality of blockchains, wherein an identifier of the first block is stored in the verification database; and store the first data item verification fingerprint in the verification database with the one or more hashes of said first authentication path and correlated the first data item verification fingerprint with the one or more hashes of said first authentication path.

17. The method of claim 1, wherein the first data item verification fingerprint, the one or more hashes of said first authentication path, one or more transaction identifiers of a current aggregated verification fingerprint, an identifier of the plurality of blockchains, and an identifier of a hash function used to generate the hashes are bundled together in the verification database.

18. The system of claim 16, wherein the first data item verification fingerprint, the one or more hashes of said first authentication path, one or more transaction identifiers of a current aggregated verification fingerprint, an identifier of the plurality of blockchains, and an identifier of a hash function used to generate the hashes are bundled together in the verification database.

19. The method of claim 17, wherein the transaction identifiers include links to the block and a transaction, into which the aggregated verification fingerprint was successfully written.

20. The system of claim 18, wherein the transaction identifiers include links to the block and a transaction, into which the aggregated verification fingerprint was successfully written.

* * * * *